United States Patent
Rohloff et al.

[15] 3,647,926
[45] Mar. 7, 1972

[54] TEACHING SYSTEM FOR PROGRAMMED CLASS AND INDIVIDUAL TEACHING

[72] Inventors: Ebbe Rohloff; Richard Lorenz, both of Erlangen, Germany

[73] Assignee: Siemens Aktiengesellschaft, Berlin and Munich, Germany

[22] Filed: Aug. 6, 1970

[21] Appl. No.: 61,736

[30] Foreign Application Priority Data

Aug. 7, 1969 Germany.....................P 19 40 127.5
July 11, 1970 Germany.....................P 20 34 451.8
July 11, 1970 Germany.....................P 20 34 452.9

[52] U.S. Cl. ..................................................35/48 R
[51] Int. Cl. ..................................................G09b 7/02
[58] Field of Search......................................35/48

[56] References Cited

UNITED STATES PATENTS 3,359,655  12/1967  Audebert...................................35/48
3,577,657  5/1971   Plumly et al..............................35/48
3,579,861  5/1971   Hallett.......................................35/48

Primary Examiner—Robert W. Michell
Assistant Examiner—J. H. Wolff
Attorney—Curt M. Avery, Arthur E. Wilfond, Herbert L. Lerner and Daniel J. Tick

[57] ABSTRACT

An instructor station for questioning a number of students with questions each of which is answerable by each of the students by a selected one of at least two possible answers provided for each student. The instructor station has a correct reply transmitter for providing the correct reply to each question, a number of signal indicators corresponding to the number of students each corresponding to a specific one of the students, and a reply number selector. Each of a plurality of similar student stations is electrically connected to the instructor station and has an actual reply selector and reply transfer key, signal indicators for evaluating the selected answer and for conveying instructions from the instructor station and a reply number selector for indicating the number of a question answered. And an evaluator is connected between the instructor station and each of the student stations for evaluating the replies selected by the students. The evaluator comprises a plurality of actual reply memories of the same number as the number of student stations connected to the instructor station for recording the correct replies to the questions supplied from the instructor station, a reply number distributor connected to each of the student stations, an actual reply distributor connected to each of the student stations, a timer connected between each of the student stations and each of the distributors for scanning the student stations and controlling the distributors accordingly, a comparator for comparing the replies selected by the students with the correct replies to the questions and providing a comparison result, a decoder and gates coupling the reply number distributor to the actual reply memories and to an input of the comparator, the actual reply distributor being connected to the other input of the comparator, a plurality of student memories connected to the output of the comparator, the student memories comprising a number of groups of memories equal to the number of student stations, each group of memories including a number of memories equal in number to the number of questions, and connectors connecting the student memories to the signal indicators of the instructor station and to the signal indicators of each of the student stations.

30 Claims, 12 Drawing Figures

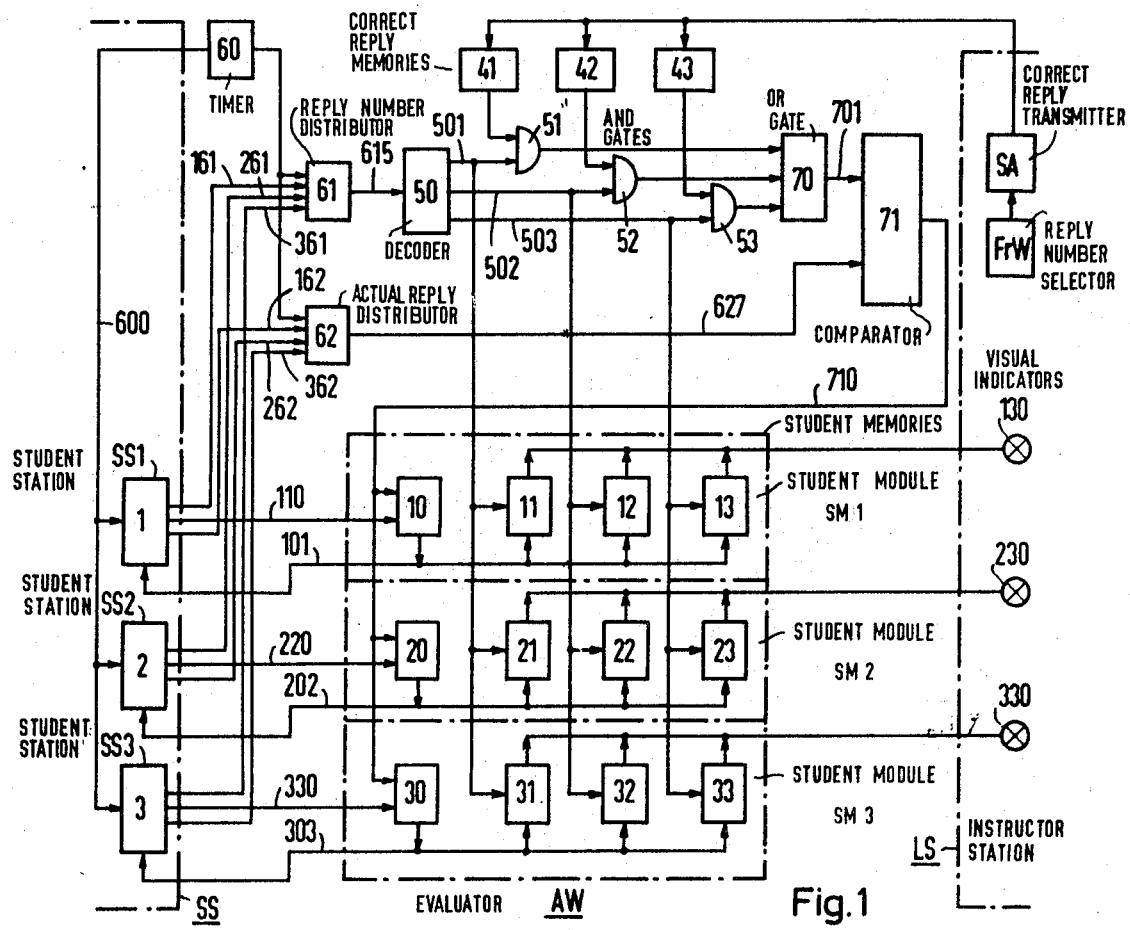
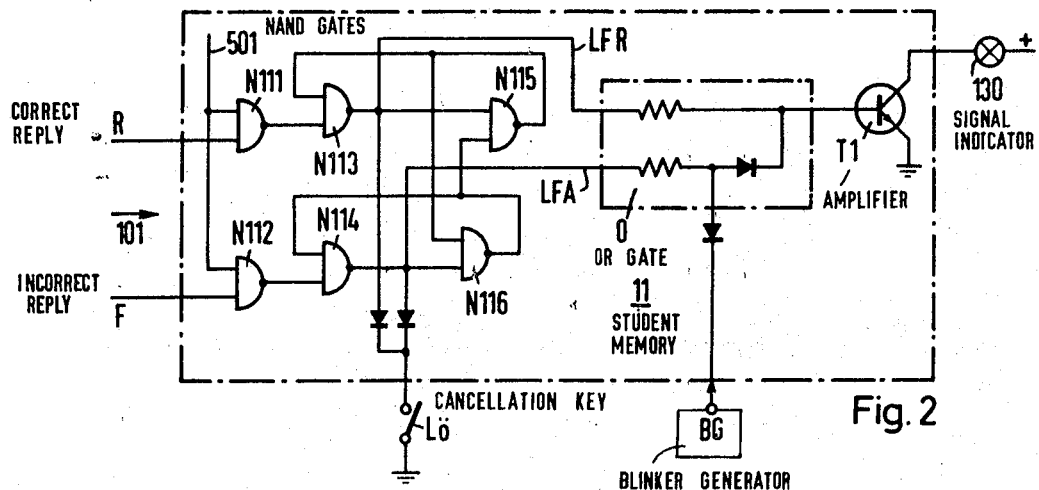

Patented March 7, 1972

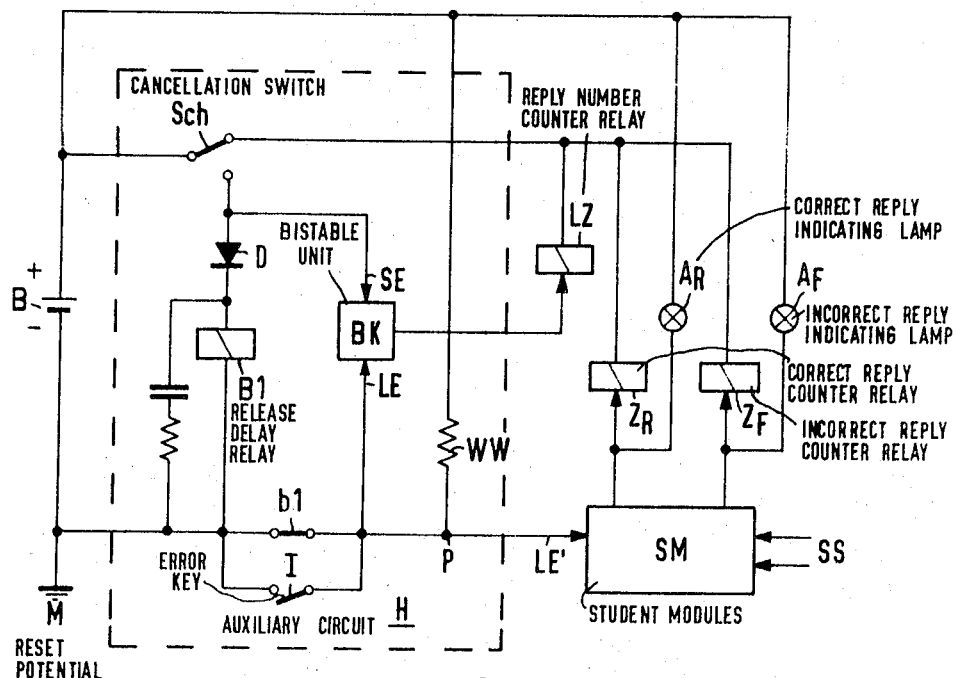
Fig. 10
RELEASE TIMES
1) R
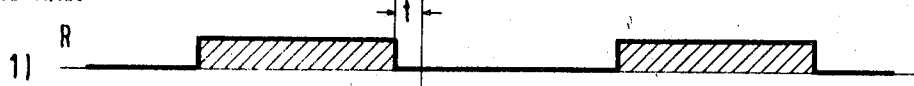
RESPONSE TIME OF RELEASE DELAY RELAY
2) B1
OPERATING TIME FOR ERROR KEY
3) I
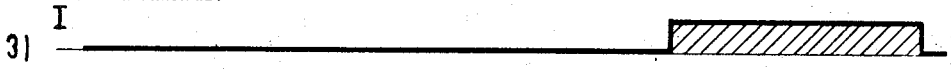
CURRENT AT CIRCUIT POINT
4) P
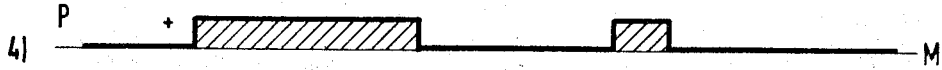
ENERGIZATION TIMES FOR COUNTERS
5) Z
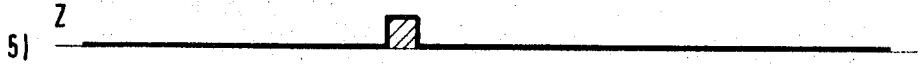
Fig. 11

TEACHING SYSTEM FOR PROGRAMMED CLASS AND INDIVIDUAL TEACHING

DESCRIPTION OF THE INVENTION

The invention relates to a teaching system. More particularly, the invention relates to a teaching system for programmed class and individual teaching.

The teaching system of the invention comprises an instructor station and a plurality of student stations electrically connected to the instructor station. The instructor at the instructor station questions the students at the student stations in accordance with the question and answer principle, whereby the students are provided with a number of questions, each of which has a number of multiple choice replies, only one of which is correct. Thus, each question has only one correct answer.

In the teaching system of the invention, each of the student stations is the same as the others. Each of the student stations has a reply selector and transmitter and signal indicators for evaluating the replies. When the student stations are individually instructed, each of said student stations also has a reply or question number selector or transmitter by which the number of the question or reply is selected. The instructor station has a correct reply transmitter for supplying the correct answers to the questions asked by the instructor. The instructor station also has a number of signal indicators equal in number to the number of student stations and to the number of questions or replies, if applicable. The instructor station also has a reply or question number selector for selecting the number of the question or reply.

The evaluator is electrically connected between the instructor station and the student stations. The evaluator has actual or correct reply memories for storing the correct replies to the answers, as supplied by the instructor. An actual reply memory is provided for each question. A timer controls a reply or answer number distributor and an actual reply distributor which scan or interrogate the replies supplied at the student stations which correspond to the question then asked. The distributors also scan the correct or actual reply memories simultaneously. The actual replies from the student stations and the correct replies from the correct reply memories are then supplied to a comparator. The comparison result is supplied to student memories each corresponding to one of the student stations and each group of student memories having a number of memories equal to the number of questions or replies. The student memories provide output signals which control the signal indicators of the instructor station and the signal indicators of the student stations.

The principal object of the invention is to provide a new and improved teaching system for programmed class and individual teaching.

An object of the invention is to provide a teaching system for programmed class and individual teaching which is of simple structure and functions with reliability, efficiency and effectiveness.

In accordance with the invention, a teaching system for programmed class and individual teaching comprises an instructor station for questioning a number of students with questions each of which is answerable by each of the students by a selected one of at least two possible answers provided for each student, the instructor station having a correct reply transmitter for providing the correct replay to each question, signal indicating means having a number of signal indicators corresponding to the number of students, each corresponding to a specific one of the students, and reply number selector means. A plurality of similar student stations are electrically connected to the instructor station. Each of the student stations has correct reply selector and reply transfer means, signal indicating means for evaluating the selected answer and for conveying instructions from the instructor station and reply number selector means for indicating the number of a question answered. Evaluating means connected between the instructor station and each of the student stations evaluates the replies selected by the students. The evaluating means comprises a plurality of correct reply memories of the same number as the number of student stations connected to the instructor station for recording the correct replies to the questions supplied from the instructor station, a reply number distributor connected to each of the student stations, and actual reply distribution connected to each of the student stations, timer means connected between each of the student stations, timer means connected between each of the student stations and each of the distributors for scanning the student stations and controlling the distributors accordingly, comparator means for comparing the replies selected by the students with the correct replies to the questions and providing a comparison result, the comparator means having a pair of inputs and an output, decoder and gate means coupling the reply number distributor and the correct reply memories to an input of the comparator means, means connecting the actual reply distributor to the other input of the comparator means, a plurality of student memories connected to the output of the comparator means, the student memories comprising a number of groups of memories equal to the number of student stations, each group of memories including a number of memories equal in number to the number of questions, and means connecting the student memories to the signal indicating means of the instructor station and to the signal indicating means of each of the student stations.

Each of a plurality of gates is coupled between the output of the comparator means and a corresponding one of the groups of student memories. The reply number distributor and the actual reply distributor of the evaluating means comprise shift register means for scanning the reply numbers of the student stations and the correct replies of the correct reply memories of the evaluating means in succession at a high switching sequence and for periodically sequentially scanning the correlated actual replies of the student stations and supplying scanned data to the comparator means. A set student memory provides a signal for actuating a corresponding one of the signal indicators of the signal indicating means of the instructor station when the reply number, selected reply and actual reply coincide. Cancellation means cancels the contents of a set student memory. The cancellation means may be manually operable and is included in the instructor station. The cancellation means may operate in accordance with the step sequence of the distributors. The cancellation means may operate in accordance with the condition of the signal indicating means. Each student memory comprises two component memories connected in series with a corresponding one of the signal indicators. The component memories are connected in a manner whereby a correct reply sets one of the component memories and an incorrect reply sets the other of the component memories. The individual student memories are electrically connected in a manner whereby only one memory of each group of memories, which is first set, may be set.

The signal indicators of the signal indicating means of the instructor station are arranged the same as the student stations with locations corresponding to the locations of the student stations. The instructor station further comprises counting means connected to the student memories for individually totaling the evaluated correct and incorrect replies.

The signal-indicating means of each student station comprises a signal lamp and the signal-indicating means of the instructor station comprises a plurality of signal lamps each corresponding to a corresponding one of the student stations. Each of the lamps is connected in a manner whereby when there is no reply from the corresponding student station the lamp is deenergized, when there is a correct reply from the corresponding student station the lamp is continually energized and when there is an incorrect reply from the corresponding student station the lamp is intermittently energized.

The signal-indicating means of each student station comprises a pair of signal lamps and the signal-indicating means of the instructor station comprises a plurality of pairs of signal lamps each pair corresponding to a corresponding one of the student stations. Each pair of lamps is connected in a manner whereby when there is a correct reply from the corresponding student station one lamp of each pair of lamps is energized and when there is an incorrect reply from the corresponding student station the other lamp of each pair of lamps is energized.

Each of the student stations includes an auxiliary key for requesting assistance and the instructor station includes signal means electrically connected to the auxiliary key of each of the student stations for indicating the operation of an auxiliary key thereby indicating a request for assistance from the corresponding one of the student stations.

The instructor station includes a plurality of key means each electrically connected to the signal-indicating means of a corresponding one of the student stations for intermittently energizing the signal indicating means of a student station which fails to respond to a question.

The actual reply selector of each of the student stations comprises a plurality of selector keys and a reply transfer key. Each of the student stations includes blocking means for the selector keys of the actual reply selector for blocking the selector keys upon an error in replying to a question and releasing the selector keys for reselection. The correct reply transmitter of the instructor station comprises a plurality of keys. The instructor station further comprises AND/OR switching means electrically connected to the keys of the correct reply transmitter and having a plurality of contacts each electrically connected in series with a corresponding key of the correct reply transmitter. Each of the selector keys of the actual reply selector of each of the student stations is electrically connected to a corresponding one of the contacts of the AND/OR switching means. Each of the student stations further comprises an auxiliary actual reply selector having a plurality of selector keys, coupling means electrically coupling the selector keys of the auxiliary actual reply selector to the contacts of the AND/OR switching means. The reply transfer key of the actual reply selector is electrically connected to the selector keys of the auxiliary actual reply selector. Supply potential means applies a supply potential to the selector keys of the auxiliary actual reply selector in a manner whereby the operation of any of the selector keys of the auxiliary actual reply selector applies the supply potential therethrough to the reply transfer key of the actual reply selector.

The actual reply selector of each of the student stations comprises three selector keys and a reply transfer key. The selector keys are binary codable in a manner whereby seven different replies may be provided by different combinations of operating the selector keys, and the reply transfer key when operated transfers the selected reply to the evaluating means. The actual reply selector of each of the student stations may comprise a rotary switch having a plurality of locking points and a plurality of contact points.

The correct reply transmitter of the instructor station may comprise a rotary switch having a plurality of locking points and a plurality of contact points.

The correct reply transmitter and the correct reply memories may be combined into a single unit at the instructor station, said unit comprising a selectable binary counter having selectable signal combinations which must coincide with the actual reply selected at a student station when the reply to a question is correct. A gate circuit comprises the reply number distributor of the evaluating means, the correct reply memories and the corresponding actual reply selector. The gate circuit provides a signal of a specific polarity for indicating a correct reply evaluation to the corresponding memory when the signal combination of the actual reply selector is the same as that of the correct reply memories and provides a signal of opposite polarity for indicating an incorrect reply evaluation to the corresponding memory when the signal combination of the actual reply selector is the same as that of the correct reply memories.

The correct reply memories, the distributors and the timer means of the evaluating means may be integrated circuits and may include a plurality of NAND gates.

The signal indicating means of the instructor station comprises a lamp field having a plurality of signal lamps each corresponding to a specific one of the student stations and a counting field having a plurality of counters each corresponding to a specific one of the student stations. The instructor station further comprises a reply number counter for indicating the number of questions, a class counter for evaluating all the incorrect and correct replies to each question, cancellation switch means for cancelling the contents of the counters and memories, and video switching means for connecting video apparatus to the instructor station. The class counter at the instructor station comprises a digital-analog converter having a counter relay and a switch operated by the counter relay. Each of the counters has terminals adapted for connection to printing means for printing the counter indications.

The instructor station further comprises counting means connected to the student memories for individually totaling the evaluated correct and incorrect replies and an auxiliary switching circuit including the cancellation means and having release delay switch means comprising a release delay relay for transferring the contents of the student memories to the counting means only after the expiration of a release period prior to the initiation of operation of the cancellation means during the delay time of the release delay relay, the cancellation means being manually operable. The cancellation means of the auxiliary switching circuit further includes cancellation potential means electrically connected to the student memories for applying a cancellation potential for cancelling the contents of set student memories. The release delay relay of said auxiliary switching circuit has a relay contact controlled thereby connected in the electrical connection between the cancellation potential means and the student memories. The auxiliary switching circuit further includes an error key connected in shunt with the relay contact of the release delay relay whereby during operation of the relay contact to discontinue the application of the cancellation potential to the student memories the error key is operable to apply the cancellation potential to the student memories.

Each of the student stations includes visual indicating means for visually indicating the condition of each of the selector keys and the reply transfer key of the actual reply selector. Each of the actual reply selectors includes depressing means for maintaining a selected selector key thereof in depressed condition when operated. The instructor station includes release means electrically connected to the actual reply selector of each student station for releasing a depressed selector key of an actual reply selector. Each of the actual reply selectors includes depressing means for maintaining a selected selector key thereof in depressed condition when operated, and each of the actual reply selectors includes spring release means for releasing a depressed selector key thereof and each of the selector keys has a head and a signal lamp therein for indicating the condition of the key.

In order that the invention may be readily carried into effect, it will now be described with reference to the accompanying drawings, wherein:

FIG. 1 is a schematic block diagram of an embodiment of the teaching system of the invention;

FIG. 2 is a circuit diagram of an embodiment of a student memory 11 of the teaching system of FIG. 1;

FIG. 10 is a circuit diagram of part of the embodiment of FIG. 6;

FIG. 11 is a graphical presentation of specific characteristics of the circuit arrangement of FIG. 10.

In the figures, the same components are identified by the same reference numerals.

When programmed instructions are provided, regardless of whether the instructions are provided for a class of students or for individual students, the students are provided with a number of questions and a number of multiple choice answers or replies for each question. Only one of the replies is correct for each question. The questions and the multiple choice answers or replies must be presented to the students either orally or in writing. If the questions are presented in written form, each student receives the same copy of the questions and proposed answers. It is, however, also possible to present the questions and the multiple choice answers to all the students simultaneously. This may be accomplished by writing the questions and proposed answers on the classroom blackboard or by projecting them on a screen via a lantern slide projection. The questions and answers may also be presented to the class as a whole by electro-optical or television apparatus.

When the teaching system of the invention is utilized for classroom instruction, the students are instructed to answer the questions in the sequence in which they are presented. They are allowed a specific predetermined period of time in which to contemplate their answers. The students are instructed not to start their consideration of the next question until the instructor asks them to do so. On the other hand, when the teaching system of the invention is utilized for programmed individual instruction, each student may answer the presented questions independently of the others, and in any sequence desired. Each student then has any desired time to contemplate his answers.

Figure 4:
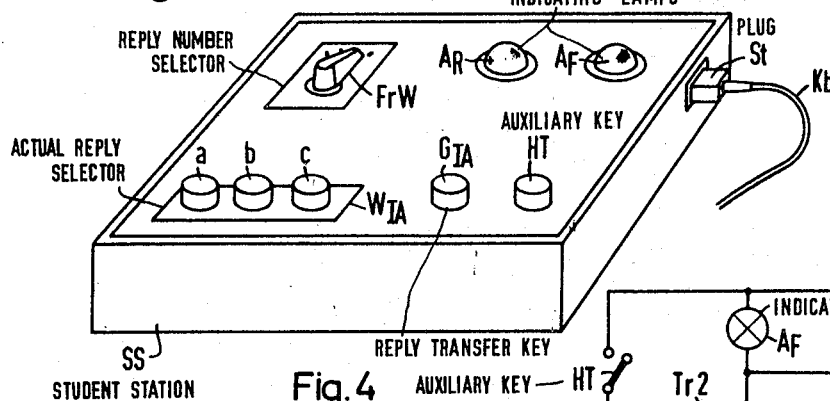
FIG. 4 is a perspective view of a student station of the teaching system of the invention.
Figure 9:
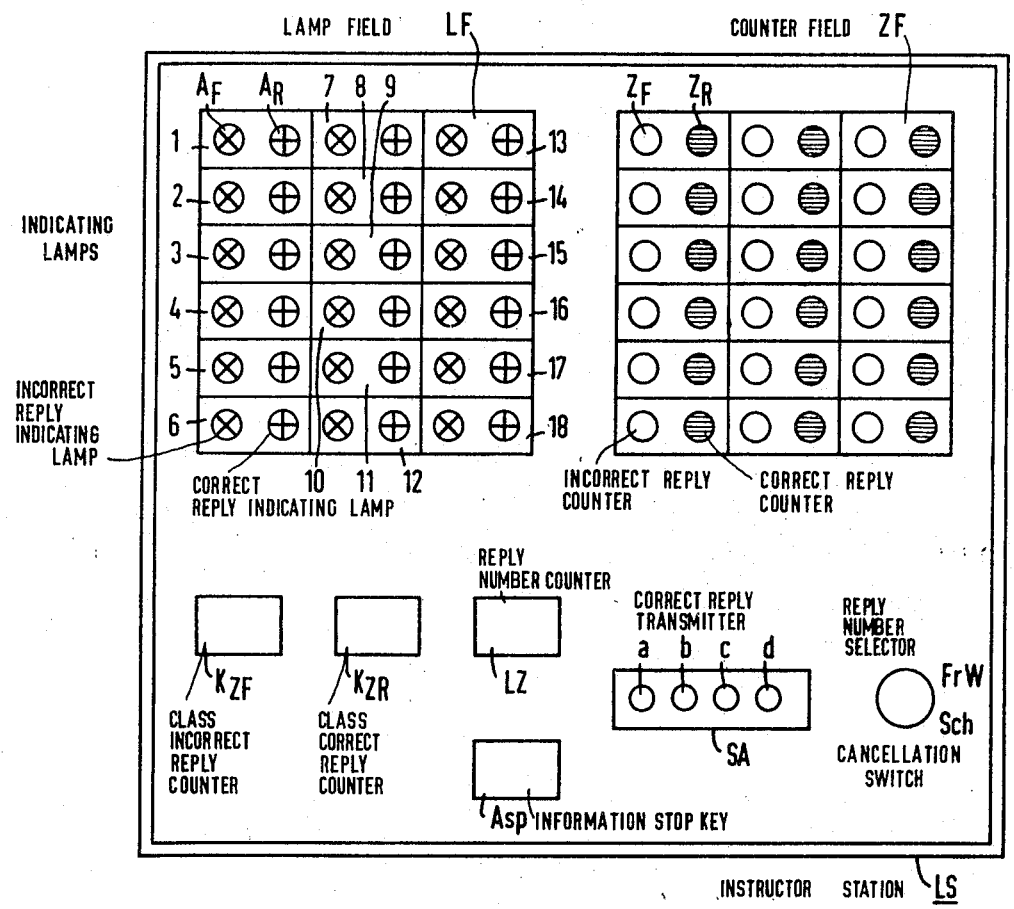
FIG. 9 is a schematic diagram of an embodiment of an instructor station of the teaching system of the invention.

The teaching system of the invention for providing individual and classroom instructions or teaching comprises a plurality of student stations SS, as shown in FIG. 1. In FIG. 1, three student stations SS1, SS2 and SS3 are shown. FIG. 4 illustrates the component parts of a student station. Each of the student stations is the same as the others. The teaching system also comprises an instructor station LS, schematically shown in FIG. 1. The components of the instructor station LS are shown in FIG. 9.

Figure 6:
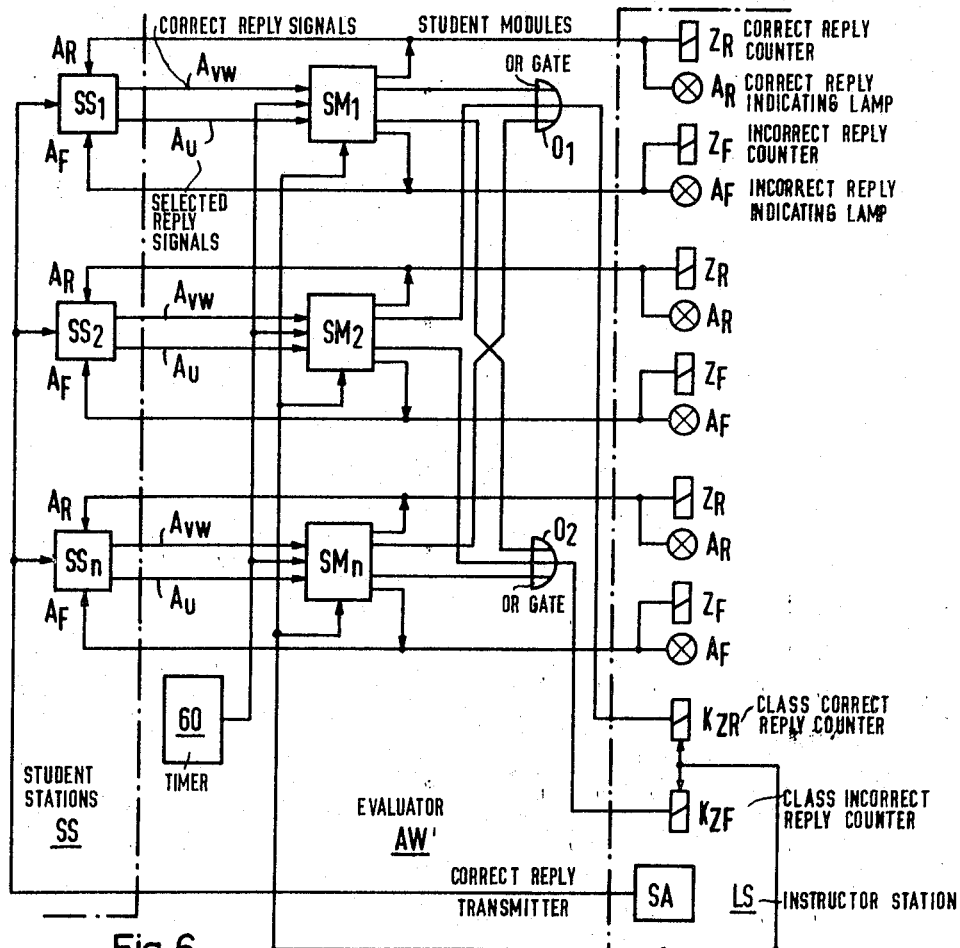
FIG. 6 is a block diagram of another embodiment of the teaching system of the invention utilized for class instruction.

In FIG. 1, an evaluator AW may be part of the instructor station LS or may be independent. The evaluator is electrically connected between the instructor station LS and each of the student stations SS. FIG. 1 illustrates the evaluator AW utilized for individual instruction and FIG. 6 illustrates the evaluator AW' utilized for classroom instruction. The teaching system for individual station is more expensive to provide than the teaching system for classroom instruction. This is due to the fact that in individual instruction a separate question or reply number indicating selector or transmitter must be provided at each student station SS and at the instructor station LS.

The teaching system for individual instruction is also more expensive to produce since the evaluator AW thereof must include a number of correct reply memories 41, 42 and 43, as shown in FIG. 1. The correct reply memories 41, 42 and 43 are provided in a number equal to the number of questions or replies. Furthermore, for individual instruction, a plurality of student memories 11, 12, 13, 21, 22, 23, 31, 32 and 33 must be provided at each student station SS1, SS2 and SS3, as shown in FIG. 1.

Figure 8:
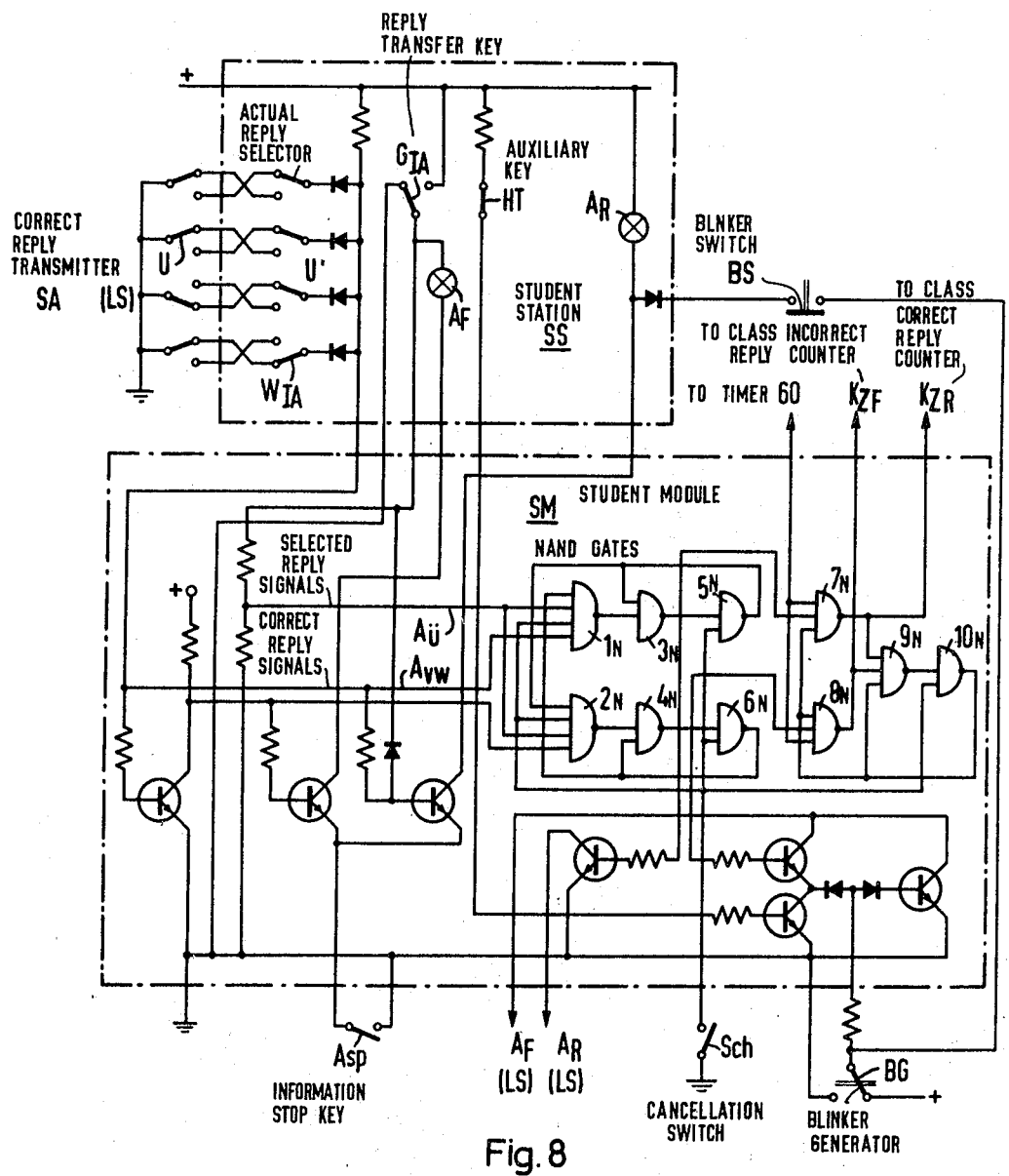
FIG. 8 is a circuit diagram of an embodiment of a student station of the teaching system of FIG. 6.

When the teaching system of the invention is utilized for classroom instruction, as illustrated in FIGS. 6 and 8, the evaluating device AW' must include only a single correct reply memory and only a single student memory for each student station. Furthermore, the question reply number selector may be eliminated from each of the student stations SS and from the instructor station LS. This is due to the fact that, as hereinbefore described, all the students at the student stations must answer a question presented before the instructor presents the next question, and the instructor does not provide the correct reply or answer for the next question until the preceding question has been completely answered.

FIGS. 1 to 5 relate to the teaching system of the invention as utilized for individual instruction. Each of the student stations SS, as shown in FIGS. 1 and 4, comprises a reply or question number selector FrW, and actual reply selector $W_{IA}$, an actual replay transfer key $G_{IA}$, and auxiliary key HT, and signal indicating lamps $A_R$ and $A_F$ for evaluating and signalling to each student at a student station whether his reply or answer is correct or incorrect. The two signal indicating lamps $A_R$ and $A_F$ may be replaced by a single signal indicating lamp A (not shown in the figures). As hereinafter described, the correct reply or answer may be signalled as a continuous or uninterrupted energization of the single lamp and an incorrect reply or answer may be signalled as an intermittent or flashing energization of the single signal lamp. As hereinafter described, the evaluation of the reply or answer at the student stations may be blocked if so indicated, if it is desired by the instructor to do so.

The instructor station LS comprises at least one correct replay transmitter SA and at least one signal-indicating lamp for each student station SS. A correct answer or reply is signalled or indicated at the instructor station LS by a continuous or uninterrupted energization of the signal lamp and an incorrect answer is signalled or indicated by an intermittent or flashing energization of the signal lamp. This enables a single signal lamp to be provided at the instructor station LS for each student SS. If no answer or reply has been transmitted from the student station SS to the instructor station LS, the lamp remains deenergized. The instructor station LS may be provided with two signal lamps for each student station SS. In such case, one of the signal lamps is energized to indicate a correct answer and the other signal of the signal lamps is energized to indicate an incorrect answer. When a pair of lamps is utilized for each student station SS, each of the lamps may be provided in a different color, or in different markings, and each, when energized, is continuously energized.

As shown in FIG. 9, the individual signal lamps $A_F$ and indicating an incorrect reply and $A_R$ for indicating a correct reply are preferably positioned at the instructor station LS in a lamp field LF in a manner whereby each pair of lamps is positioned in correspondence with the location of the corresponding student station SS. A counter field ZF at the instructor station LS is electrically coupled to the lamp field LF. The counter field ZF comprises a counter $Z_F$ for incorrect answers and a counter $Z_R$ for correct answers, each pair of such counters being positioned in correspondence with the location of the corresponding student station SS. Thus, each student station SS is represented at the instructor station LS by an incorrect reply indicating lamp $A_F$, a correct reply indicating lamp $A_R$, and incorrect reply counter $Z_F$ and a correct reply counter $Z_R$.

As shown in FIG. 9, the instructor station LS includes a class incorrect reply counter $K_{ZF}$, a class correct reply counter $K_{ZR}$ and a reply number counter LZ. The class incorrect reply counter $K_{ZF}$ indicates to the instructor how many incorrect answers were selected for a specific question. The class correct reply counter $K_{ZR}$ indicates to the instructor how many correct answers have been selected to a specific question. The counters are provided with terminals adaptable for connection to printing apparatus which enable the count results to be printed. The reply number counter LZ indicates to the instructor how many questions have been asked. Throughout the present disclosure, the words "reply number" are intended to convey, in actuality, the meaning of the question number, since each question is provided with a reply. Thus, for example, reply number 18 would be the reply to question number 18. This is not to be confused with the selected reply which is that one of the multiple choice possibilities selected at the student station as the reply to a question.

A reply number selector FrW is provided at each instructor station LS, as shown in FIG. 9, when teaching system is utilized for individual instruction. A question sequence key is provided at the instructor station when the teaching system is utilized for class instruction. When operated, the question sequence key provides the next question. Furthermore, if necessary, a key may be provided at the instructor station LS for continuous connection of video apparatus to said instructor station. The video apparatus may comprise any suitable equipment such as, for example, a video type projector.

The evaluator AW of the teaching system of the invention utilized for individual instruction, as shown in FIG. 1, comprises a plurality of student modules SM1, SM2 and SM3. The student module SM1 is provided for, and electrically connected to, the student station SS1 via leads or electrical conductors 110 and 101. The student module SM2 is provided for, and electrically connected to, the student station SS2 via leads or electrical conductors 220 and 202. The student module SM3 is provided for, and electrically connected to, the student station SS3 via leads or electrical conductors 330 and 303.

The student module SM1 comprises a gate 10 and a plurality of student memories 11, 12 and 13 equal in number to the number of questions presented. The student module SM2 comprises a gate 20 and a plurality of student memories 21, 22 and 23 equal in number to the number of questions presented. The student module SM3 comprises a gate 30 and a plurality of student memories 31, 32 and 33 equal in number to the number of questions presented. The correct reply memories 41, 42 and 43 are also equal in number to the number of question presented.

Although, in order to maintain the clarity of illustration, the teaching system of FIG. 1 is shown with a provision for three questions and three student stations SS, it may, of course, be readily expanded to cover the presentation of any suitable number of questions and to include any suitable number of student stations. In order to expand the teaching system of the invention, it is only necessary to expand the reply number selector FrW of the instructor station LS to a number of contact points equal to the number of questions presented, to increase the number of correct reply memories 41, 42 and 43 to a number equal to the number of questions presented, and to increase the number of student modules SM to a number equal to the number of student stations SS. The number of student memories in each of the student modules SM would then be increased to a number equal to the number of questions presented. When the teaching system of the invention is so expanded, the number of signal lamps at the instructor station LS is correspondingly increased. The number of a plurality of components 51, 52, 61 and 62, as hereinafter described, must also be increased, correspondingly, as must the number of outputs of a component 50, hereinafter described.

At the beginning or commencement of the teaching period, the instructor at the instructor station LS supplies the three correct replies to each set of three questions to the correct replay memories 41, 42 and 43 via the correct answer transmitter or correct reply transmitter SA at said instructor station. The number of each question is indicated by the reply number selector FrW at the instructor station LS. The student at each student station SS moves his reply number selector FrW to the number of the question presented and then selects a reply to the question by moving his actual reply selector $W_{IA}$ to the desired reply. The actual reply selector $W_{IA}$ is operated by depression of keys a, b or c (FIG. 4). The student at the student station SS then operates his reply transfer key $G_{IA}$ (FIG. 4) to transmit his selected reply to the evaluator AW.

The evaluator AW includes a timer or keyer 60. The timer 60 controls a reply number distributor 61 which comprises a slidable or movable storage arrangement. The timer 60 also controls an actual reply distributor 62. The actual replay distributor 61 is electrically connected to each of the student stations SS via electrical conductors 161, 261 and 361. The actual reply distributor 62 is electrically connected to each of the student stations SS via electrical conductors 162, 262 and 362. The timer 60 is electrically connected to each of the student stations SS via an electrical conductor 600 and to each of the distributors 61 and 62, and scans said student stations and controls said distributors accordingly. The actual reply distributor 62 scans the actual replies or answers of the student stations in sequence at a pulse frequency of 10 to 1,000 Hertz.

A decoder 50 has an input connected to the output of the reply number distributor 61 via an electrical conductor 615. A first output of the decoder 50 is connected to an input of an AND-gate 51 via an electrical conductor 501. A second output of the decoder 50 is connected to an input of an AND-gate 52 via an electrical conductor 502. A third output of the decoder 50 is connected to an input of an AND-gate 53 via an electrical conductor 503. The output of the correct reply memory 41 is connected to the other input of the AND-gate 51. The output of the correct reply memory 42 is connected to the other input of the AND-gate 52. The output of the correct reply memory 43 is connected to the other input of the AND-gate 53. The output of each of the AND-gates 51, 52 and 53 is directly connected to a corresponding input of an OR-gate 70. The output of the OR-gate 70 is directly connected to an input of a comparator 71 via an electrical conductor 701. The output of the actual reply distributor 62 is directly connected to another input of the comparator 71 via an electrical conductor 627.

Thus, the question or reply numbers from the reply number distributor 61 and the correct replies from the correct reply memories 41, 42 and 43 are periodically scanned; the question or reply number information being supplied via the lead 615 to the decoder 50. The actual answers or replies selected at the student stations are also scanned. The reply or question number information is supplied via the leads 501, 502 and 503 to the AND-gates 51, 52 and 53, where it causes the transfer of the correct reply or answer information to the comparator 71 via said AND-gates. The actual reply information is provided via the actual reply distributor 62 to the other input of the comparator 71. The comparator 71 then compares the correct replies to the questions with the actual replies to said questions as selected and transmitted from the student stations. The comparator 71 functions to make the described comparison when the timer 60 appropriately controls the operation of the reply number distributor and the actual reply distributor 62.

The comparison result of the comparator 71 is supplied to a first input of each of the gates or AND-gates 10, 20 and 30 of the student modules SM1, SM2 and SM3, respectively, via an electrical conductor 710. The comparison result causes each of the AND-gates 10, 20 and 30 to transfer the signal supplied to its second input. The second input of the AND-gate 10 is directly connected to the student station SS1 via the electrical conductor 110. The second input of the AND-gate 20 is directly connected to the student station SS2 via the electrical conductor 220. The second input of the AND-gate 30 is directly connected to the student station SS3 via the electrical conductor 330. The output of the AND-gate 10 is connected to an input of each of the student memories 11, 12 and 13. The output of the AND-gate 20 is connected to an input of each of the student memories 21, 22 and 23. The output of the AND-gate 30 is connected to an input of each of the student memories 31, 32 and 33.

Each of the student memories 11, 21 and 31 has a second input connected to the first output of the decoder 50 via the electrical conductor 501. Each of the student memories 12, 22 and 32 has a second input connected to the second output of the decoder 50 via the electrical conductor 502. Each of the student memories 13, 23 and 33 has a second input connected to the third output of the decoder 50 via the electrical conductor 503.

The output of the AND-gate 10 is supplied to the student station SS1 via the electrical conductor 101 and to the first input of each of the student memories 11, 12 and 13. The output of the AND-gate 20 is supplied to the student station SS2 via the electrical conductor 202 and to the first input of each of the student memories 21, 22 and 23. The output of the AND-gate 30 is supplied to the student station SS3 via the electrical conductor 303 and to the first input of each of the student memories 31, 32 and 33. Each of the AND-gates 10, 20 and 30 transfers the signal of the reply transfer key $G_{IA}$ of the corresponding student stations SS1, SS2 and SS3, respectively.

Each student station SS has an electrically conducting output cable comprising a plurality of leads. Thus, the student station SS1 has an output cable 161, the student station SS2 has an output cable 261 and the student station SS3 has an output cable 361. The output cables 161, 261 and 361 of the student stations SS are connected as inputs to the reply number distributor 61. Each student station SS has another electrically conducting output cable comprising a plurality of electrical conductors. Thus, the student station SS1 has another output cable 162, the student station SS2 has another output cable 262 and the student station SS3 has another output cable 362. The other output cables 162, 262 and 362 of the student stations SS are connected as inputs of the actual reply distributor 62. The output of the timer 60 is connected to a free input of the reply number distributor 61 and to a free input of the actual reply distributor 62. The timer 60 progressively scans the individual student stations SS1, SS2 and SS3 in sequence, via the electrical conductor 600. During the scanning of the student stations SS by the timer 60, the reply number distributor 61 scans the reply numbers and the actual reply distributor 62 scans the actual replies selected at the student stations.

The question or reply number is supplied by the student stations SS1, SS2 and SS3 to the reply number distributor 61 via the output cables 161, 261 and 361, respectively. The student stations SS1, SS2 and SS3 supply the actual replies selected thereat to the actual reply distributor 62 via the output cables 162, 262 and 362. The student stations SS1, SS2 and SS3 supply signals indicating the transfer of the selected reply to the AND-gates 10, 20 and 30, respectively, via the electrical conductors 110, 220 and 330, respectively. Thus, the signal conductors for the reply or question numbers are connected to the reply number distributor 61. The signal conductors for the actual selected replies of the students are connected to the actual reply distributor 62. The signal conductors are connected to the corresponding inputs of the AND-gates 10, 20 and 30 of the student modules SM1, SM2 and SM3, respectively.

The distributors 61 and 62 are controlled or triggered by the timer 60 in a manner whereby, at a specific instant, only the signals of a single student station are supplied via the electrical conductors 615 and 627. The signals on the electrical conductor 615, from the reply number distributor 61, are decoded by the decoder 50 in a manner whereby a signal appears at only one of its three outputs at any instant. The correct reply for the first question is stored or recorded in the correct reply memory 41. The correct reply for the second question is stored in the correct reply memory 42. The correct reply for the third question is stored in the correct reply memory 43.

The correct reply corresponding to the question or reply number decoded in the question number decoder 50 is supplied to the OR-gate 70 via the AND-gates 51, 52 and 53 in a manner whereby only one correct reply is supplied at a specific time to the comparator 71. The comparator 71 may comprise a plurality of exclusive OR gates. The comparator 71 compares the correct reply with the actual reply selected at each of the student stations SS and supplied to said comparator via the actual reply distributor 62 and the electrical conductor 627. Each of the actual selected replies of the student stations SS is provided at the same time and from the same student station SS as is the question or reply number.

The comparison result provided by the comparator 71 indicates either a correct reply or an incorrect reply from the student station SS. The comparison result is supplied to all the AND-gates 10, 20 and 30 of the student modules SM via the electrical conductor 710. When one of the electrical conductors 110, 220 and 330 indicates to the corresponding AND-gate 10, 20 and 30, respectively, that the corresponding student station is in line and has selected an answer, one of said AND gates is switched to its conductive condition. The output signals of the AND-gates 10, 20 and 30 are simultaneously supplied to the corresponding student stations SS1, SS2 and SS3, respectively, and to the corresponding student memories 11, 12 and 13, 21, 22 and 23, and 31, 32 and 33, respectively, in a manner whereby only that student memory at which the question or reply number, the student station number and the selected reply coincide, is set.

A visual indicator 130 is connected to the output of each of the student memories 11, 12 and 13. A visual indicator 230 is connected to the output of each of the student memories 21, 22 and 23. A visual indicator 330 is connected to the output of each of the student memories 31, 32 and 33. The visual indicators 130, 230 and 330 are provided at the instructor station LS. Each of the first group of student memories 11, 12 and 13, the second group of student memories 21, 22 and 23 and the third group of student memories 31, 32 and 33 stores the first correct and incorrect answer or reply transmitted from the student station to a specific question. A belated correction of his selected reply by the student is impossible. If the student at the student station SS selects and transmits another reply to the same question, the second reply will be evaluated in the same manner as the first reply and will be indicated by the signal indicators at the student station. The student memories, however, once set, cannot be changed. The cancellation of the contents of a student memory and the cancellation of a signal indication by a signal lamp must be provided at the instructor station LS by suitable means, hereinafter described.

The teaching system of the invention may be expanded for a greater number of student stations by increasing the number of student stations SS and the number of student modules SM. The teaching system of the invention may be expanded to present an increased number of questions, if the reply number distributor 61 is expanded, the actual reply distributor 62 is expanded, the number of correct reply memories 41, 42 and 43 is increased, the number of AND-gates 51, 52 and 53 is increased and the capacity of the OR-gate 70 is increased. The required additional expense in expanding the teaching system is approximately proportional to the product of the number of student stations and the number of questions.

The signal or visual indicators 130, 230 and 330 are preferably provided at the instructor station LS in correspondence with the actual locations of the student stations, the student stations being located at the seats of the students. Appropriate counters are provided at the instructor station and are electrically connected to the student memories to indicate the results of the evaluations of correct and incorrect replies or answers.

Each of the signal or visual indicators 130, 230 and 330 at the instructor station LS and each of the signal or visual indicators at the student stations SS (FIG. 4) may comprise a single signal lamp which is deenergized when the student station does not select a reply, is continuously energized when the reply selected at a student station is correct, and is intermittently energized when the reply selected at a student station is incorrect. The intermittent energization of a signal lamp may be provided by any suitable means such as, for example, a timer.

FIG. 2 illustrates one of the student memories such as, for example, the student memory 11, of the embodiment of FIG. 1. In FIG. 2, the student memory 11 comprises two component memories. The first component memory comprises a plurality of NAND-gates N111, N113 and N115 for storing the correct selected replies. The second component memory comprises a plurality of NAND-gates N112, N114 and N116 for storing the incorrect selected replies.

An incorrect reply F and a correct reply R are supplied by the AND-gate 10 via the electrical conductor 101 (FIG. 1) and are transferred to one of the incoming groups of the student memory 11 via the first input of the NAND-gates N111 and N112. The electrical conductor 501 is connected to the second input of each of the NAND-gates N111 and N112. The correct selected reply is supplied from the output conductor LFR of the component memory via the NAND-gates N113 and N115 and energizes the signal indicator 130 at the instructor station LS. The correct selected reply may also energize the corresponding signal indicator at the corresponding student station. The signal utilized to energize the signal indicator 130 may first be amplified in any suitable amplifier such as, for example, a transistor amplifier T1. The signal indicator 130 is continuously energized to indicate the correct selected reply.

The incorrect selected reply is derived from the component memory via the NAND-gates N114 and N116 and is supplied via an output electrical conductor LFA to the signal indicator 130 via the amplifier T1. The incorrect selected reply signal may also be supplied to the signal indicator of the corresponding student station SS. The output of the incorrect selected reply component memory is connected to the NAND-gates N114 and N116 and the output of the correct selected reply component memory is connected to the NAND-gates N113 and N115. The outputs of the component memories are connected to the signal indicator 130 via an OR-gate 0 and the amplifier T1, said OR gate being connected to the base electrode of said amplifier. The transistor of the amplifier T1 is connected in grounded emitter configuration.

The interconnection of both component memories of the student memory permits the selected reply at each instant to be evaluated only as correct or incorrect. Thus, the single signal indicator lamp 130 must distinguish between an indication for a correct selected reply and an incorrect selected reply. Continuous energization of the signal indicator lamp 130 indicates a correct selected reply and intermittent energization of said lamp indicates an incorrect selected reply. When the selected reply is evaluated as incorrect, the signal produced by a blinker generator BG is supplied to the output circuit LFA of the incorrect selected reply component memory via a decoupling diode to the OR-gate O. A cancellation key Lo is coupled to each of the output circuits LFR and LFA via decoupling diodes and is utilized to cancel the contents of the component memories.

The single signal indicator lamp 130 may, of course, be replaced by two signal lamps. One of the signal lamps then indicates the correct selected reply and the other signal lamp indicates an incorrect selected reply. Each of the lamps is preferably of a different color from that of the other.

Figure 3:
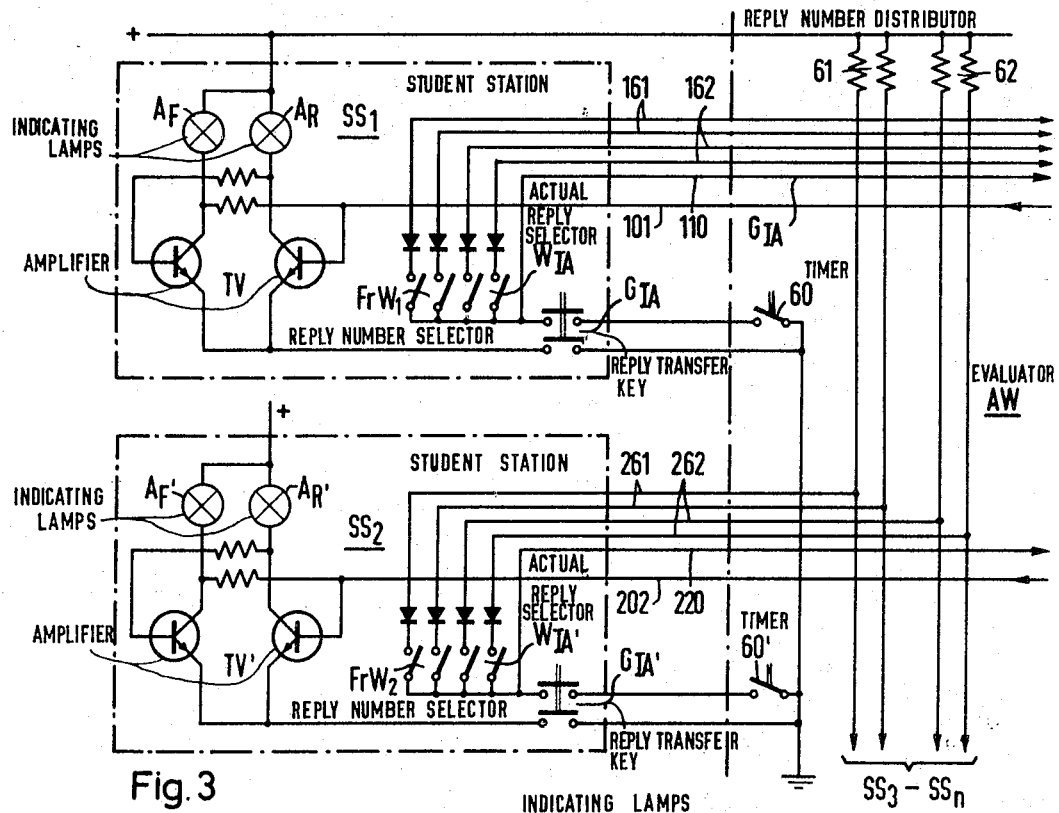
FIG. 3 is a circuit diagram of two of the student stations of the embodiment of FIG. 1.

FIG. 3 illustrates the circuits of two student stations $SS_1$ and $SS_2$. In the embodiment of FIG. 3, the correct selected reply evaluation and the incorrect selected reply evaluation are indicated by two signal or indicating lamps $A_R$ and $A_F$, respectively. The signal lamps $A_R$ and $A_F$ are connected to the output of a transistor amplifier TV. The transistor amplifier TV comprises a pair of transistors connected in cross feedback relation with each other. The indicating lamps are energized via the electrical conductors 101 and 202 (FIG. 1). Each of the student stations $SS_1$ and $SS_2$ comprises a reply number selector FrW1 and FrW2, respectively. The reply number selectors FrW1 and FrW2 are connected to the reply number distributor 61 (FIG. 1) via the electrical conductors 161 and 261, respectively, and to the actual reply selectors $W_{IA}$ and $W_{IA'}$, respectively. The actual replay selector $W_{IA}$ is connected to the corresponding AND-gate 10 of the student module SM1 via the electrical conductor 110. The actual reply selector $W_{IA'}$ is connected to the corresponding AND-gate 20 of the student module SM2 via the electrical conductor 220.

The student station $SS_1$ has a reply transfer key $G_{IA}$ and the student station $SS_2$ has a reply transfer key $G_{IA'}$. When the reply transfer key $G_{IA}$ is depressed or operated, it provides a connecting lead from the reply number selector FrW1 and the actual reply selector $W_{IA}$ to ground via the timer 60 of the evaluator AW. When the reply transfer key $G_{IA'}$ is depressed or operated, it provides a connecting lead from the reply number selector FrW2 and the actual reply selector $W_{IA'}$ to ground via the timer 60 of the evaluator AW. Operation of the reply transfer key $G_{IA}$ connects the emitter electrodes of the transistors of the amplifier TV to ground. Operation of the reply transfer key $G_{IA'}$ connects the emitter electrodes of the transistors of the amplifier TV' to ground.

FIG. 4 illustrates a student station SS. The student station SS is electrically connected to the evaluator AW and to the instructor station LS via a cable Kb and a plug St. If the evaluator AW is provided at the instructor station LS in a single unit, the student station SS need only be connected to the instructor station. The individual student stations SS are provided at each place where a student is seated.

The student station SS comprises the actual reply selector $W_{IA}$. The actual reply selector $W_{IA}$ has a plurality of individual keys $a, b, c$, and so on. A mechanical or electrical locking and unlocking member is coupled to each of the keys $a, b, c$, and so on of the actual reply selector $W_{IA}$. If the keys of the actual reply selector are selected in error by the student, such keys may be unlocked or their depression may be cancelled. Thus, when the keys $a, b, c$, and so on of the actual reply selector $W_{IA}$ are operated, they are depressed, and remain locked in their depressed condition. The keys $a, b, c$, and so on may be released by the operation of a cancellation key, not shown in FIG. 4. The keys $a, b, c$, and so on of the actual reply selector $W_{IA}$ may also be locked and unlocked by any suitable electromagnetic means which holds the depressed keys locked in their depressed condition. It is important that the mechanical or electrical condition of each key $a, b, c$, and so on of the actual reply selector $W_{IA}$ and of the reply transfer key $G_{IA}$ be immediately recognized by the student at the student station in order to cancel or release an erroneous selected reply to a question. The recognition of the condition of the keys is preferably provided by visual indication. It is possible that the keys may be released by remote control from the instructor station LS.

Since the sight of a depressed one of the keys $a, b, c$, and so on of the actual reply selector $W_{IA}$ by a student seated nearby may lead such student to submit the same selected reply, without consideration for the correct reply to the answer, thereby cheating, it is necessary to provide means for preventing such cheating. Thus, for example, a spring may be provided at each key $a, b, c$, and so on of the actual reply selector $W_{IA}$ and may function so that when the student depresses the desired key in order to select his reply, if he then applies additional pressure on the selected key, the corresponding spring will move the depressed key back to its initial released condition. The visual indication of the selected reply will remain in a signal lamp which is countersunk in the head of the key. Each of the keys $a, b, c$, and so on is thus provided with a countersunk signal lamp in its head. The signal lamp indicates whether or not the key has been depressed in order to select a reply to the question.

The student may depress one or more of the keys $a, b, c$, and so on, of the actual reply selector $W_{IA}$ prior to depressing the reply transfer key $G_{IA}$. The neighboring student cannot recognize the selected combination of depressed keys and thus cannot repeat the selected reply. The actual reply or selection of the keys $a, b, c$, and so on of the actual reply selector $W_{IA}$ may be provided in binary code. Thus, selected combinations of three keys may provide as many as seven different answers or replies. The student may be instructed in the operation of the code by the provision of an instruction sheet at the student station. The instruction sheet may indicate, for example, that the first reply or answer may be selected by depressing the keys $a$ and $c$, the second reply or answer may be selected by depressing the keys $a, b$ or $c$, and so on.

The keys $a, b, c$, and so on of the actual reply selector $W_{IA}$ may be replaced, of course, by a rotary switch having an appropriate number of key or contact points. The actual reply selector may then be operated merely by rotating the rotary switch until it is at a numbered rest position corresponding to the number of the reply desired to be selected by the student. Thus, for example, if the rotary switch is rotated until it comes to rest at position number three, the student thereby selects reply number three to the question. The correct reply transmitter SA of the instructor station LS is provided in correspondence with the keys a, b, c, and so on of the actual reply selector $W_{IA}$ of the student stations SS, and may be coded, if necessary. The correct reply transmitter SA of the instructor station LS may be replaced by a rotary switch.

Figure 5:
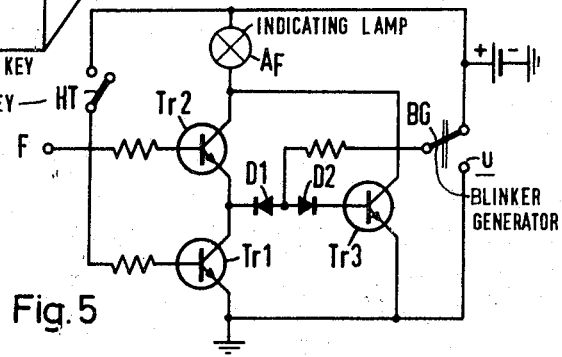
FIG. 5 is a circuit diagram of an embodiment of an indicator of a student station of the teaching system of the invention.

An auxiliary key HT is provided at each student station SS, as shown in FIGS. 4 and 5. When the student depresses the auxiliary key HT, he transmits a signal to the instructor station LS indicating that the student requires assistance. Thus, when the auxiliary key HT at a student station SS is depressed, one of the two signal lamps corresponding to that student station will be energized at the instructor station LS. This is illustrated in FIG. 5.

It is assumed that the instructor station LS includes more than two indicating lamps for each student station SS. In FIG. 5, a single indicating lamp $A_F$ is continuously energized when an incorrect selected reply is transmitted from the student station SS and is intermittently energized when a correct selected reply is transmitted from the student station, as explained with reference to FIG. 9.

The control switch shown in FIG. 5 may be connected to the evaluator AW, or may be connected to the instructor station LS. The circuit arrangement of FIG. 5 comprises two transistors Tr1 and Tr2, connected in series circuit arrangement with each other, with the emitter electrode of the transistor Tr2 directly connected to the collector electrode of the transistor Tr1. The emitter electrode of the transistor Tr1 is connected to ground and the collector electrode of the transistor Tr2 is connected to the indicating lamp $A_F$. The base electrode of the transistor Tr2 is connected to the incorrect selected reply circuit and has the incorrect selected reply supplied thereto. The base electrode of the transistor Tr2 may thus be connected, for example, to the output circuit LFA of FIG. 2.

A common point in the connection between the emitter electrode of the transistor Tr2 and the collector electrode of the transistor Tr1 is coupled to the base electrode of a transistor Tr3 via a pair of oppositely poled diodes D1 and D2. The emitter electrode of the transistor Tr3 is connected to the emitter electrode of the transistor Tr1 and to ground. The collector electrode of the transistor Tr3 is directly connected to the collector electrode of the transistor Tr2 and to the indicating lamp $A_F$. As hereinbefore indicated, the indicating lamp $A_F$ indicates incorrect selected replies. Operating potential is applied to the contact of the indicating lamp $A_F$ opposite that connected to the transistor Tr2 and the transistor Tr3. The auxiliary key HT is connected between the base electrode of the transistor Tr1 and the source of operating potential, which may comprise a battery.

A switch $u$ is controlled by a blinker generator BG and also applies the operating potential to the circuit, in the position of the switch illustrated in FIG. 5. When the switch $u$ is in its other condition, in which it contacts its second contact terminal, which is grounded, the operating potential is not applied to the circuit. The contact arm of the switch $u$ is connected to a common point in the connection between the diodes D1 and D2.

When the auxiliary key HT is depressed, it opens its electrical contact. The transistor Tr1 is thus switched to its nonconductive condition and the transistor Tr3 is controlled by the blinker generator BG via the switch $u$ at a preferred frequency of 25 Hertz. The indicating lamp $A_F$ is then intermittently energized via the transistor Tr3 at a blinker frequency and indicates visually to the instructor at the instructor station LS that the corresponding student station has a student who needs assistance. If no assistance is required, and the auxiliary key HT is in its released condition, in which its electrical contact is closed, the transistor Tr1 is switched to its conductive condition and the transistor Tr3 is switched to its nonconductive condition. When an incorrect selected reply signal is supplied to the transistor Tr2, said transistor is switched to its conductive condition and continuously energizes the indicating lamp $A_F$.

The circuit arrangement of FIG. 5 may be utilized to transmit signals in opposite directions, so that the instructor at the instructor station LS may contact a specific student station SS. For this purpose, the instructor station LS may be provided with a calling key for each student station SS, either in the lamp field LF or in the counter field ZF of FIG. 9. Operation or depression of the calling key by the instructor energizes a signal lamp at a corresponding student station SS. The signal lamp may be intermittently energized, for example, so that it blinks, thereby reminding the student at such student station to respond to the question.

The teaching system for individual instruction, as hereinbefore described, may be utilized without restriction for class instruction, since by proceeding from one teaching step to the next, the teacher only advises the students at the student stations SS to switch the reply number selector FrW one step farther. However, if class instruction is to be instituted, the production expenses may be considerably reduced, since the reply number selector FrW may be completely eliminated and the correct reply memories 41, 42 and 43 of the evaluator AW may also be eliminated. The production costs of the student modules SM is thus accordingly decreased.

Figure 7:
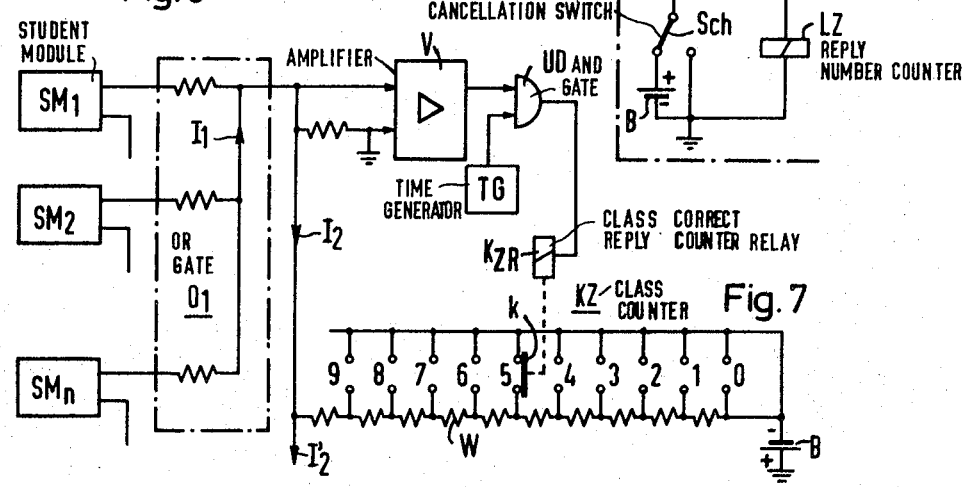
FIG. 7 is a schematic block and circuit diagram of an embodiment of the class counter KZ of the teaching system of the invention.

A teaching system of the invention for class instruction is shown in FIG. 6. FIG. 8 illustrates a student station and the corresponding student module of the teaching system of FIG. 6. FIG. 7 shows a class counter KZ of the teaching system of FIG. 6. FIG. 9 shows an instructor station of the teaching system of the invention for individual instruction.

FIG. 6 shows the student stations $SS_1$ to $SS_n$, the evaluator AW' and the instructor station LS. The evaluator AW' comprises the student modules $SM_1$ to $SM_n$ and a pair of OR-gates $O_1$ and $O_2$. The OR-gate $O_1$ transfers the correct reply signals and the OR-gate $O_2$ transfers the incorrect reply signals for each question. The timer or keyer 60 is connected to each of the student modules $SM_1$ to $SM_n$ and functions in the same manner as the timer 60 of the system of FIG. 1, to coordinate the comparison between the correct replies to the questions and the actual selected replies to the questions.

The instructor station LS includes the correct reply transmitter SA which is adjusted by the instructor upon proceeding to the next question. As hereinbefore described, the instructor station LS includes incorrect reply indicating lamps $A_F$ and correct reply indicating lamps $A_R$, provided in pairs, the number of pairs being the same as the number of student stations SS. The indicating lamps $A_F$ and $A_R$ are located in a lamp field LF which corresponds to the locations of the student stations SS, as shown in FIG. 9. The instructor station LS includes a counter field ZF (FIG. 9) which includes correct reply counters $Z_R$ and incorrect reply counters $Z_F$, positioned in pairs, the number of pairs of counters corresponding to the number of student stations SS.

As shown in FIG. 9, a class correct reply counter $K_{ZR}$ and class incorrect reply counter $K_{ZF}$ are provided at the instructor station LS. The class correct reply counter $K_{ZR}$ and the class incorrect reply counter $K_{ZF}$ provide indications to the instructor of the correct selected replies and the incorrect selected replies transmitted from the student stations SS. The class correct reply counter $K_{ZR}$ is connected to the output of the OR-gate $O_1$ and the class incorrect reply counter $K_{ZF}$ is connected to the output of the OR-gate $O_2$. An output of each of the student modules $SM_1$ to $SM_n$ is connected to corresponding inputs of the OR-gate $O_1$. Another output of each of the student modules $SM_1$ to $SM_n$ is connected to corresponding inputs of the OR-gate $O_2$. A third output of each of the student modules $SM_1$ to $SM_n$ is connected to a correct reply counter $Z_R$ and a correct reply indicating lamp $A_R$. A fourth output of each of the student modules $SM_1$ to $SM_n$ is connected to an incorrect reply counter $Z_F$ and an incorrect reply indicating lamp $A_F$.

The third output of each of the student modules $SM_1$ to $SM_n$ is connected to a correct reply indicating lamp $A_R$ at each corresponding student station $SS_1$ to $SS_n$. The fourth output of each of the student modules $SM_1$ to $SM_n$ is connected to an incorrect reply indicating lamp $A_F$ at each corresponding student station $SS_1$ to $SS_n$. Correct reply signals $A_{VW}$ and selected reply signals $A_U$ are supplied to two separate inputs of each of the student modules $SM_1$ to $SM_n$ from the corresponding student stations $SS_1$ to $SS_n$. The output of the timer 60 is supplied to a third input of each of the student modules $SM_1$ to $SM_n$, so that pulses are supplied to said third inputs. Cancellation signals supplied by the cancellation switch Sch is supplied to a fourth input of each of the student modules $SM_1$ to $SM_n$. The cancellation signals from the cancellation switch Sch release or cancel the contents of the student modules $SM_1$ to $SM_n$ upon the completion of each question and its replies.

The cancellation switch Sch at the instructor station LS may correspond the the reply number selector FrW. The release or cancellation of the contents of the student modules SM may be accomplished manually, by operation of the cancellation switch Sch, or may be accomplished in accordance with the step sequence of the timer 60 and the slide recorder included therewith, upon completion of one or more questions. The contents of the student modules SM may also be released during or after the operation of the indication lamps A or the counters Z. When the cancellation switch Sch is operated, the reply number counter LZ of the instructor LS advances or counts one number during the transfer from one question to the next, thereby indicating to the instructor the number of questions already presented.

An information stop key Asp is provided at the instruction station LS and is electrically connected, as shown in FIG. 8, to terminate the energization of the correct reply indicating lamps $A_R$ and the incorrect reply indicating lamps $A_F$ at the student stations SS after the selected replies have been transmitted from the student stations.

FIG. 8 is a circuit arrangement of each of the student stations SS and the corresponding modules SM of the evaluator AW' of the teaching system of the invention utilized for class instruction. The correct reply transmitter SA, which is provided at the instructor station LS, is represented, for the sake of simplicity, as a plurality of switches U which may be adjusted by the keys of said correct reply transmitter (FIG. 9). Corresponding switches U' of the actual reply selector $W_{IA}$ of the student station SS are connected to the switches U of the correct reply transmitter SA in crossover fashion. The switches U and U' may comprise a single unit and preferably comprise electronic switches. This eliminates the need for moving contact members and thereby eliminates wear and tear on the switch elements.

The electronic switch elements of the correct reply transmitter SA may be of selected binary code counter type. The same electronic switch elements may be utilized for the actual reply selector $W_{IA}$. This enables the correct reply transmitter SA, the correct reply memories and the actual reply selector $W_{IA}$ to be provided as small components modules or blocks which require very little space, especially when they are integrated circuits.

The instructor at the instructor station LS provides the correct reply for each question by providing the signal combinations by operation of the correct reply transmitter SA. If the actual selected reply from the student station SS is correct, the selected signal combinations of the actual reply selector $W_{IA}$ must be the same as those of the correct reply transmitter SA. In the embodiment of FIG. 8, the correct reply transmitter SA and actual reply selector $W_{IA}$ function as a comparison gate or comparator, and supply an output signal of a specific polarity indicative of the correct evaluation into the correct memory of the student station SS. The correct output signal is provided by the combination of the correct reply transmitter SA and the actual reply selector $W_{IA}$ if the signal combinations of said transmitter and said selector are the same. If the signal combinations of the correct reply transmitter SA and the actual reply selector $W_{IA}$ are not the same, the combination thereof produces an output signal of the opposite polarity, which is the incorrect signal, and which is supplied to the incorrect memory of the corresponding student station SS. In FIG. 8, the positions of the switches U and U' are not the same as each other, so that an incorrect output signal is supplied to the incorrect memory of the student station SS when the reply transfer key $G_{IA}$ is depressed. The incorrect output signal also energizes the signal lamp $A_F$ at the student station SS and at the instructor station LS.

The student module SM comprises a plurality of NAND gates. A NAND-gate 1N controls the correct component memory comprising NAND-gates 3N and 5N. A NAND-gate 2N controls the incorrect component memory 4N and 6N. Both component memories are connected to an evaluating component memory comprising NAND-gates 9N and 10N controlled by NAND-gates 7N and 8N. The evaluating component memory determines whether the correct component memory and the incorrect component memory have been scanned. The output of the NAND-gate 7N is connected to the class correct reply counter $K_{ZR}$ and the output of the NAND-gate 8N is connected to the class incorrect reply counter $K_{ZF}$. The OR-gate $O_1$ (FIG. 6) is interposed between the NAND-gate 7N and the class correct reply counter $K_{ZR}$ and the OR-gate $O_2$ is interposed between the NAND-gate 8N and the class incorrect reply counter $K_{ZF}$ (FIG. 6).

The output of the evaluating component memory 9N, 10N, which is the output of the NAND-gate 10N and the output of the NAND-gate 9N, is connected as a first input to each of the control NAND-gates 7N and 8N. The timer 60 is connected to a second input of each of the control NAND-gates 7N and 8N. The output of the component memory 3N, 5N is connected to a third input of the NAND-gate 7N. The output of the component memory 4N, 6N is connected to a third input of the NAND-gate 8N. The outputs of the component memory 3N, 5N and of the component memory 4N, 6N are connected to the lamp field LF of the instructor station LS. The signal lamps $A_R$ are connected to the correct component memory 3N, 5N and the incorrect signal lamps $A_F$ are connected to the incorrect component memory 4N, 6N.

The incorrect indicating lamp $A_F$ is connected in a control circuit shown in FIG. 5, which permits the student at the student station SS to request assistance from the instructor by operating the auxiliary key HT. As hereinbefore described, the instructor may contact the student at the student station SS by operating a blinker switch BS. The information stop key Asp of the instructor station LS permits the instructor to prevent the evaluating signal from being supplied to the student station SS. The cancellation switch Sch of the instructor station LS controls the NAND-gates 1N, 2N, 10N, 5N and 6N and permits the cancellation or release of the contents of the student modules SM. The selected reply signals $A_U$ are supplied to corresponding inputs of each of the NAND-gates 1N and 2N and the correct reply signals $A_{VW}$ are supplied to other corresponding inputs of said NAND gates.

FIG. 7 illustrates an embodiment of the class counter KZ of the instructor station LS (FIG. 9), which may be utilized as the class counter replay counter $K_{ZR}$ or the class incorrect reply counter $K_{ZF}$. As shown in FIG. 6, the student modules $SM_1$ to $SM_n$ control the class counters $K_{ZR}$ and $K_{ZF}$ via the OR-gates $O_1$ and $O_2$, respectively. Part of the embodiment of FIG. 6 is included in the circuit of FIG. 7. The output of the OR-gate $O_1$ is connected to an input of an amplifier V. The output of the amplifier V is connected to a first input of an AND-gate UD. The time generator TG is connected to the second input of the AND-gate UD. The time generator TG may comprise, for example, the blinker generator BG (FIG. 8) or the timer 60 (FIG. 6).

The output of the AND-gate UD is connected to the relay of the class correct reply counter $K_{ZR}$. The class correct replay counter relay $K_{ZR}$ controls a reply contact k which is a movable contact and which may bridge any of a plurality of contact points 0C, 1C, 2C, 3C, 4C, 5C, 6C, 7C, 8C and 9C. A resistor W is connected between each set of contact points 0C and 1C, and so on, as illustrated. The switching arrangement, including the contact points 0C to 9C and the relay contact k, functions to indicate the number of student modules SM which have selected correct replies.

If a correct $I_1$ is greater than a current $I_2$, the amplifier V switches and the AND-gate UD to its conductive condition, thereby permitting the class correct reply counter relay $K_{ZR}$ to respond to, or be energized by, the time signals provided by the time generator TG. When the class correct reply relay $K_{ZR}$ is energized, its relay contact k advances one step. The comparison current $I_2$ thus increases until the currents $I_1$ and $I_2$ are the same. When this occurs, the AND-gate UD is switched to its nonconductive condition. The operation of the class current reply counter relay $K_{ZR}$ then corresponds to the number of student modules SM which have selected correct replies.

An increase to several decades is permitted by the parallel supply of the current $I_2$ by utilizing an additional counter relay having a relay contact $k'$ and additional resistors $W'$ bridged by a plurality of contacts 0C to 9C (not shown in FIG. 7). The circuit of FIG. 7 is thus a digital to analog converter for permitting counting by a counting relay combined with a switch.

Each of the counters utilized in the teaching system of the invention, including the class counters $K_{ZR}$ and $K_{ZF}$, is provided with terminals adapted to connect it to printing apparatus for printing the corresponding counter position, condition or count, thereby recording the results accumulated in the counter.

In accordance with another feature of the invention, the cancellation switch Sch of FIG. 6, for cancelling or releasing the contents of the student modules SM, upon the provision of the next question, may be operated by an auxiliary circuit H, as shown in FIG. 10. This enables a correction of the correct reply in the event of erroneous operation of the correct reply transmitter SA at the instructor station LS, before the selected replies of the student stations SS, as compared with the erroneous correct replies from said correct reply transmitter, may be stored in the counters $Z_R$ and $Z_F$.

In FIG. 10, an error key I is connected in shunt with a relay contact b1 controlled by a release delay relay B1. A bistable unit BK is connected across the series circuit arrangement of the release delay relay B1 and a diode D. The output of the bistable unit BK is connected to the reply number counter relay LZ. The error key I is normally open. The relay contact b1 maintains the student modules SM and the bistable unit BK in released condition, when the cancellation switch Sch is in its condition shown in FIG. 10.

When the cancellation switch Sch is switched to its other operating condition, opposite to that shown in FIG. 10, the release operation is initiated. The positive operating potential of a battery B is then removed from the reply number counter relay LZ, the correct reply counter relay $Z_R$ and the incorrect reply counter relay $Z_F$. The reply number counter LZ, the correct reply counter $Z_R$ and the incorrect reply counter $Z_F$ then cannot respond. The positive operating potential is applied to a set input SE of the bistable unit BK and to the diode D. The positive operating potential of the battery B thus energizes the release delay relay B1. When the relay contact b1 is opened, a reset potential M is removed from a reset input LE of the bistable unit BK.

When the reset potential M is removed from the circuit by the opening of the relay contact b1, the positive potential of the battery B is applied to a resistor WW to provide for a release of the bistable unit BK and the student module SM. At the commencement of the release, therefore, the bistable unit BK is set, but the relay number counter relay LZ does not respond, since there is no application may the positive potential. During the release time, the students may transmit their selected replies. If the selected reply of the student station SS is the same as the correct replies provided by the instructor at the instructor station LS, the signal lamps $A_R$, connected in series with the student module SM, are energized. If the selected reply is incorrect, the signal lamps $A_F$, connected in series with the student module SM, will be energized. The incorrect reply counter relay $Z_F$ is not deenergized, however, since there is no application of the positive operating potential.

As soon as the release time or period is terminated, during which the selected replies of the student stations SS are evaluated, the cancellation switch Sch is switched back to its position or condition shown in FIG. 10. The reply number counter relay LZ, the correct reply counter relay $Z_R$ and the incorrect reply counter relay $Z_F$ are then energized for a short period of time during the delay time of the release delay relay B1. Consequently, the bistable unit BK, which is still in its set condition, may then further control the reply number counter LZ. The correct reply counter $Z_R$ and the incorrect reply counter $Z_F$ may then be controlled in accordance with the stored contents of the student modules SM.

The release delay relay B1 is deenergized by a delay circuit component such as, for example, an RC circuit. Therefore, the relay contact b1 of the relay R1 only closes after the operation of the bistable unit BK and the scanning of the student modules SM. The contents of the student modules SM are released upon initiation of the delay by the release delay relay B1 and the closing of its relay contact b1.

The operation of the error key I thus permits the auxiliary circuit H to be utilized to correct erroneous adjustment of the correct reply transmitter SA of the instructor station LS, even after operation of the cancellation switch Sch, without energizing the counters $Z_R$ and $Z_F$. This prevents the counters $Z_R$ and $Z_F$ from storing or indicating incorrect data. If the error key I is depressed or operated during the release period, the reset potential M is applied to the reset input LE of the bistable unit BK and the reset input LE' of the student modules SM. The selected replies transmitted by the students at the student stations SS will thus not be evaluated and the reply number counter LZ will not be deenergized. Until the instant that the error key I is depressed or operated, after the release period, the selected replies transmitted by the students at the student stations SS are indicated. The indications of the selected replies are eliminated, however, upon the operation of the error key I, due to the release of the contents of the student modules SM.

The conditions of operation of the circuit arrangement of FIG. 10 are shown in detail in the graphical presentations of FIG. 11. The first curve 1 of FIG. 11 illustrates the release time period R. The second curve 2 of FIG. 11 illustrates the response times or periods of the release delay relay B1, which is energized at the commencement of the release period, but continues to remain energized after the termination of the release period, for the delay period or time t. The third curve 3 of FIG. 11 shows the operating time for the error key I during a release period. The fourth curve 4 of FIG. 11 illustrates the current at a circuit point P of FIG. 10. A positive supply current is apparent in the circuit point P at the commencement of the release period, for the duration of the energization of the release delay relay B1. The current is provided via the resistor WW. During the times or pulses that the error key I is operated or depressed, the reset potential M is applied to the circuit point P. The fifth curve 5 of FIG. 11 shows the energization times or periods for the counters LZ, $Z_R$ and $Z_F$. The counters LZ, $Z_R$ and $Z_F$ may thus respond exclusively during the delay period t of the release delay relay B1.

In FIG. 8, the correct reply transmitter SA of the instructor station LS and the actual reply selector $W_{IA}$ of the student station SS are illustrated as being adjacent each other. The correct reply transmitter SA and the actual reply selector $W_{IA}$ each comprises, in the embodiment of FIG. 8, four keys which mechanically operate the corresponding switch elements U and U' thereof. The actual selected reply from the student station SS is evaluated as correct only when the combination of positions of the switch elements U' is exactly the same as the combination of positions of the switch elements U, as hereinbefore described.

The correct reply provided by the instructor at the instructor station LS by operation of the correct reply transmitter SA may be expedited by the depression of only a single key. Thus, for example, only the key $a$ may be depressed, and the remaining keys $b$, $c$ and $d$ may remain in their normal or released condition (FIG. 9). The instructor at the instructor station LS may also depress more than one of the keys $a$, $b$, $c$ and $d$ of the correct reply transmitter SA, or all of said keys (FIG. 9). The selected reply from the student station SS is evaluated as correct when the signal combinations of the keys of the correct reply transmitter SA and of the actual reply selector $W_{IA}$ are identical.

If the questions presented by the instructor are so formulated and said instructor adjusts the correct reply transmitter SA in a manner whereby, of the various possible replies to the question one reply is correct and a second reply may be correct with qualifications, the consideration of the replies selected by the students would be unjust. Such a situation occurs if the instructor depresses the keys $b$ and $d$ of the correct reply transmitter SA (FIG. 9), for example, and said instructor desires that the reply selected by the student not only be correct with qualifications, when the student depresses the keys $b$ and $d$ of his actual reply selector $W_{IA}$, but also when either the key $b$ or the key $d$ alone is depressed. This would be a difficult situation to attain. In order to provide such a situation, an additional feature of the teaching system of the invention, as shown in FIG. 12, may be utilized.

Figure 12:
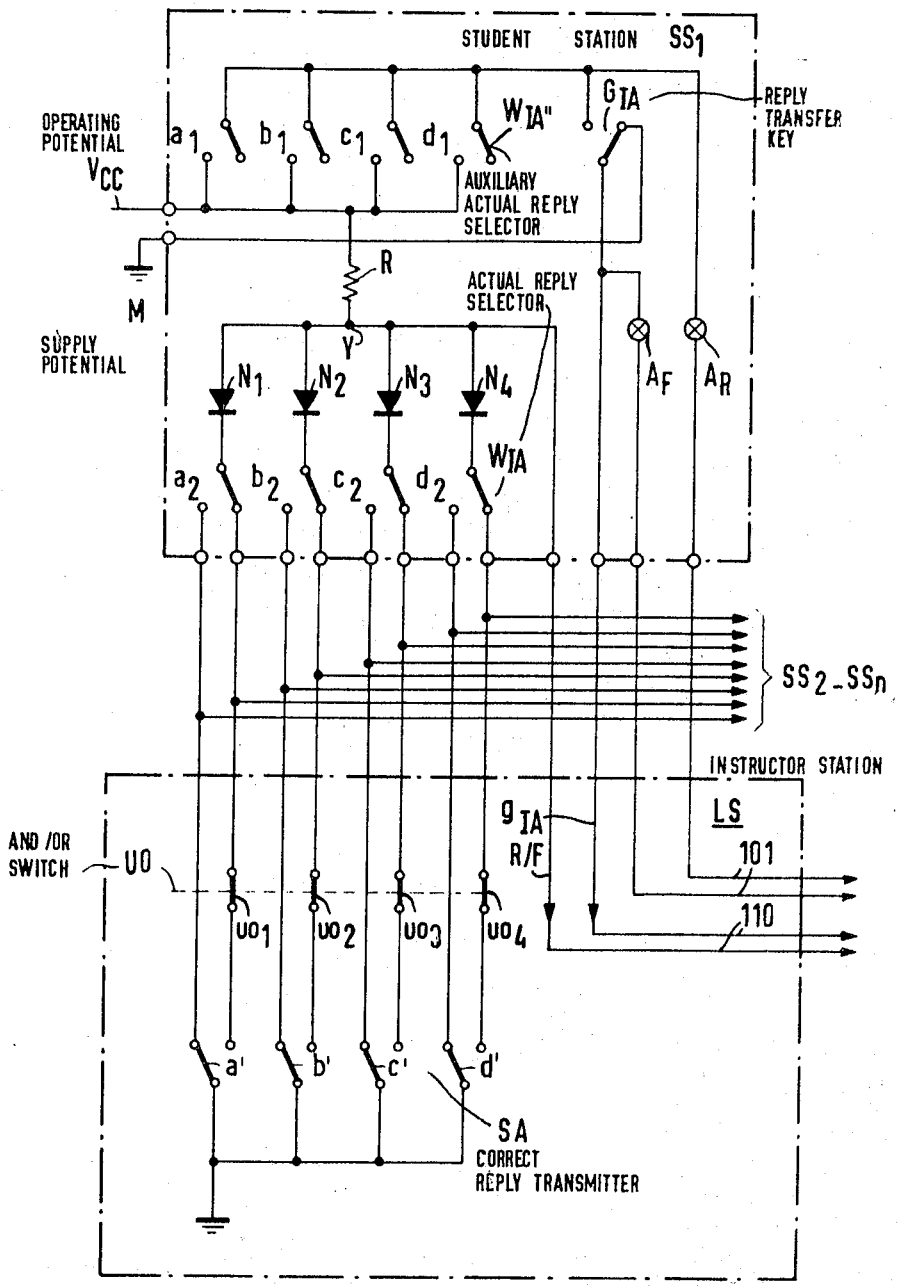
FIG. 12 is a circuit diagram of a modification of part of the teaching system of the invention.

As shown in FIG. 12, the instructor station LS is provided with an AND/OR switch UO. The AND/OR switch UO comprises a plurality of switching contacts $uo_1$, $uo_2$, $uo_3$ and $uo_4$, each of which is directly connected at one end to a corresponding one of the switch contacts $a'$, $b'$, $c'$ and $d'$ of the correct reply transmitter SA of the instructor station LS. Each of the switch contacts $a'$, $b'$, $c'$ and $d'$ is operated by a key corresponding thereto. The switch contacts $uo_1$ to $uo_4$ of the AND/OR switch UO are closed when the AND condition is imposed and are opened when the OR condition is imposed.

The actual reply selector $W_{IA}$ has a plurality of switch contacts $a_2$, $b_2$, $c_2$ and $d_2$. Each of the contacts $a_2$ to $d_2$ of the actual reply selector $W_{IA}$ is operated by a corresponding key. An auxiliary actual reply selector $W_{IA''}$ is provided at the student station and comprises a plurality of switch contacts $a_1$, $b_1$, $c_1$ and $d_1$. Each of the switch contacts $a_1$ and $a_2$ is operated by the same key. Each of the contacts $b_1$ and $b_2$ is operated by the same key. Each of the contacts $c_1$ and $c_2$ is operated by the same key. Each of the contacts $d_1$ and $d_2$ is operated by the same key. When the actual reply selector $W_{IA}$ is operated, the corresponding ones of the switch contacts $a_1$, $b_1$, $c_1$ and $d_1$ of the auxiliary actual reply selector $W_{IA''}$ are also operated and an operating potential $V_{CC}$ is applied to the reply transfer key $G_{IA}$. Otherwise, the circuit of FIG. 12 is the same as that of FIG. 8.

When the AND/OR switch UO is in its AND condition, the switch contacts $uo_1$ to $uo_4$ are closed. When the switch contacts of the correct reply transmitter SA at the instructor station LS and the switch contacts of the actual reply selector $W_{IA}$ of the student stations $SS_1$ to $SS_n$ are not depressed in the same combination, the circuit between the student station SS and the instructor station LS is closed. That is, the operating potential $V_{CC}$ is combined with or connected to the supply potential MM via a resistor $R'$ and a plurality of diodes $N_1$, $N_2$, $N_3$ and $N_4$. The resistor $R'$ has one end connected in common to one end of each of the switch contacts $a_1$, $b_1$, $c_1$ and $d_1$ of the auxiliary actual reply selector $W_{IA''}$ and its other end connected to a circuit point Y, which circuit point Y is connected in common to one end of each of the diodes $N_1$, $N_2$, $N_3$ and $N_4$.

When the operating potential $V_{CC}$ and the supply potential MM are combined, approximately the supply potential MM is applied to the resistor $R'$. Thus, an electrical conductor R/F, which is connected to the circuit point Y, also has approximately the supply potential MM applied thereto. The supply potential MM is approximately zero volts and corresponds to an incorrect signal or a signal indicating an incorrect reply. The electrical conductor R/F supplies signals corresponding to an incorrect reply and to a correct reply to the electrical conductor 110 (FIG. 1).

When the keys of the correct reply transmitter SA and the keys of the actual reply selector $W_{IA}$ are depressed in a corresponding manner, so that said transmitter and said selector are connected to the circuit point Y, the operating potential $V_{CC}$, which corresponds to the binary 1 signal, provides a signal in the electrical conductor R/F which corresponds to a correct reply. When the instructor at the instructor station LS depresses the keys $a'$ and $c'$ of the correct reply transmitter SA, the student at the student station $SS_1$ must also depress the keys $a_2$ and $c_2$ of the actual reply selector $W_{IA}$, in order to provide a signal indicating a correct reply when said student operates the reply transfer key $G_{IA}$. At such time, an electrical conductor $g_{IA}$, from the reply transfer key $G_{IA}$ to the electrical conductor 110, only conducts a signal current when one of the keys $a_1$, $b_1$, $c_1$ and $d_1$ has been previously depressed. This is due to the fact that only then is the operating potential $V_{CC}$ applied to the reply transfer key $G_{IA}$.

When the AND/OR switch UO is in its OR condition, its switch contacts $uo_1$ to $uo_4$ are open. When the AND/OR switch UO is in its OR condition, a zero signal, representing an incorrect reply, is supplied via the electrical conductor R/F, when the student at the student station $SS_1$ depresses the wrong keys $b_2$ and $d_2$ of the actual reply selector $W_{IA}$. If, however, the student depresses the key $a_2$ or $c_2$ of the actual reply selector $W_{IA}$, or both of such keys, a binary 1 signal, which indicates a correct reply, is supplied by the electrical conductor R/F. If the student at the student station $SS_1$ does not depress any of the keys $a_2$ to $d_2$ of the actual reply selector $W_{IA}$, the operating potential $V_{CC}$ is applied to the circuit point Y and to the electrical conductor R/F, so that a binary 1 signal is supplied via said electrical conductor. However, upon the subsequent operation of the reply transfer key $G_{IA}$, there is no binary 1 signal supplied by the electrical conductor $g_{IA}$, due to the switch contacts $a_1$, $b_1$, $c_1$ and $d_1$ being open. Thus, no reply is indicated to, or evaluated by, the teaching system.

While the invention has been described by means of specific examples and in specific embodiments, we do not wish to be limited thereto, for obvious modifications will occur to those skilled in the art without departing from the spirit and scope of the invention.

We claim:

1. A teaching system for programmed class and individual teaching, comprising an instructor station for questioning a number of students with questions each of which is answerable by each of the students by a selected one of at least two possible answers provided for each student, the instructor station having a correct reply transmitter for providing the correct reply to each question, signal indicating means having a number of signal indicators corresponding to the number of students each corresponding to a specific one of said students, and reply number selector means;

a plurality of similar student stations electrically connected to the instructor station, each of said student stations having correct reply selector and reply transfer means, signal indicating means for evaluating the selected answer and for conveying instructions from the instructor station and reply number selector means for indicating the number of a question answered;

evaluating means connected between said instructor station and each of said student stations for evaluating the replies selected by the students, said evaluating means comprising a plurality of correct reply memories of the same number as the number of student stations connected to the instructor station for recording the correct replies to the questions supplied from the instructor station, a reply number distributor connected to each of said student stations, an actual reply distributor connected to each of said student stations, timer means connected between each of said student stations and each of said distributors for scanning said student stations and controlling said distributors accordingly, comparator means for comparing the replies selected by the students with the correct replies to the questions and providing a comparison result, said comparator means having a pair of inputs and an output, decoder and gate means coupling said reply number distributor and said correct reply memories to an input of said comparator means, means connecting said actual reply distributor to the other input of said comparator means, a plurality of student memories connected to the output of said comparator means, the student memories comprising a number of groups of memories equal to the number of student stations, each group of memories including a number of memories equal in number to the number of questions, and means connecting said student memories to the signal indicating means of the instructor station and to the signal indicating means of each of said student stations.

2. A teaching system as claimed in claim 1, further comprising a plurality of gates each coupled between the output of said comparator means and a corresponding one of the groups of student memories, and wherein the reply number distributor and the actual reply distributor of the evaluating means comprise shift register means for scanning the reply numbers of the student stations and the correct replies of the correct reply memories of the evaluating means in succession at a high switching sequence and for periodically sequentially scanning the correlated actual replies of the student stations and supplying scanned data to said comparator means, a set student memory providing a signal for actuating a corresponding one of the signal indicators of the signal indicating means of the instructor station when the reply number, selected reply and actual reply coincide.

3. A teaching system as claimed in claim 2, further comprising cancellation means for cancelling the contents of a set student memory.

4. A teaching system as claimed in claim 3, wherein said cancellation means is manually operable and is included in the instructor station.

5. A teaching system as claimed in claim 3, wherein said cancellation means operates in accordance with the step sequence of said distributors.

6. A teaching system as claimed in claim 3, wherein said cancellation means operates in accordance with the condition of said signal-indicating means.

7. A teaching system as claimed in claim 3, wherein the instructor station further comprises counting means connected to the student memories for individually totalling the evaluated correct and incorrect replies and an auxiliary switching circuit including the cancellation means and having release delay switch means comprising a release delay relay for transferring the contents of the student memories to the counting means only after the expiration of a release period prior to the initiation of operation of said cancellation means during the delay time of the release delay relay, the cancellation means being manually operable.

8. A teaching system as claimed in claim 7, wherein the cancellation means of said auxiliary switching circuit further includes cancellation potential means electrically connected to the student memories for applying a cancellation potential for cancelling the contents of set student memories, and the release delay relay of said auxiliary switching circuit has a relay contact controlled thereby connected in the electrical connection between said cancellation potential means and said student memories, said auxiliary switching circuit further including an error key connected in shunt with the relay contact of said release delay relay whereby during operation of said relay contact to discontinue the application of the cancellation potential to the student memories said error key is operable to apply said cancellation potential to said student memories.

9. A teaching system as claimed in claim 2, wherein each student memory comprises two component memories connected in series with a corresponding one of said signal indicators, said component memories being connected in a manner whereby a correct reply sets one of said component memories and an incorrect reply sets the other of said component memories.

10. A teaching system as claimed in claim 9, wherein the individual student memories are electrically connected in a manner whereby only one memory of each group of memories, which is first set, may be set.

11. A teaching system as claimed in claim 1, wherein the signal indicators of the signal indicating means of the instructor station are arranged the same as the student stations with locations corresponding to the locations of the student stations.

12. A teaching system as claimed in claim 1, wherein said instructor station further comprises counting means connected to the student memories for individually totalling the evaluated correct and incorrect replies.

13. A teaching system as claimed in claim 1, wherein the signal-indicating means of each student station comprises a signal lamp and the signal indicating means of the instructor station comprises a plurality of signal lamps each corresponding to a corresponding one of the student stations, each of said lamps being connected in a manner whereby when there is no reply from the corresponding student station the lamp is deenergized, when there is a correct reply from the corresponding student station the lamp is continually energized and when there is an incorrect reply from the corresponding student station the lamp is intermittently energized.

14. A teaching system as claimed in claim 1, wherein the signal-indicating means of each student station comprises a pair of signal lamps and the signal-indicating means of the instructor station comprises a plurality of pairs of signal lamps each pair corresponding to a corresponding one of the student stations, each pair of lamps being connected in a manner whereby when there is a correct reply from the corresponding student station one lamp of each pair of lamps is energized and when there is an incorrect reply from the corresponding student station the other lamp of each pair of lamps is energized.

15. A teaching system as claimed in claim 1, wherein each of the student stations includes an auxiliary key for requesting assistance and the instructor station includes signal means electrically connected to the auxiliary key of each of said student stations for indicating the operation of an auxiliary key thereby indicating a request for assistance from the corresponding one of the student stations.

16. A teaching system as claimed in claim 1, wherein the instructor station includes a plurality of key means each electrically connected to the signal indicating means of a corresponding one of the student stations for intermittently energizing the signal indicating means of a student station which fails to respond to a question.

17. A teaching system as claimed in claim 1, wherein the actual reply selector of each of the student stations comprises a plurality of selector keys and a reply transfer key.

18. A teaching system as claimed in claim 17, wherein the correct reply transmitter of the instructor station comprises a plurality of keys, the instructor station further comprising AND/OR switching means electrically connected to the keys of said correct reply transmitter and having a plurality of contacts each electrically connected in series with a corresponding key of said correct reply transmitter, and wherein each of the selector keys of the actual reply selector of each of the student stations is electrically connected to a corresponding one of the contacts of the AND/OR switching means, and each of the student stations further comprises an auxiliary actual reply selector having a plurality of selector keys, coupling means electrically coupling the selector keys of the auxiliary actual reply selector to the contacts of the AND/OR switching means, the reply transfer key of the actual reply selector being electrically connected to the selector keys of the auxiliary actual reply selector, and supply potential means for applying a supply potential to the selector keys of the auxiliary actual reply selector in a manner whereby the operation of any of the selector keys of the auxiliary actual reply selector applies the supply potential therethrough to the reply transfer key of the actual reply selector.

19. A teaching system as claimed in claim 17, wherein each of the student stations includes blocking means for the selector keys of the actual reply selector for blocking said selector keys upon an error in replying to a question and releasing said selector keys for reselection.

20. A teaching system as claimed in claim 19, wherein each of the student stations includes visual indicating means for visually indicating the condition of each of the selector keys and the reply transfer key of the actual reply selector.

21. A teaching system as claimed in claim 20, wherein each of the actual reply selectors includes depressing means for maintaining a selected selector key thereof in depressed condition when operated, and wherein the instructor station includes release means electrically connected to the actual reply selector of each student station for releasing a depressed selector key of an actual reply selector.

22. A teaching system as claimed in claim 20, wherein each of the actual reply selectors includes depressing means for maintaining a selected selector key thereof in depressed condition when operated, and wherein each of the actual reply selectors includes spring release means for releasing a depressed selector key thereof and each of the selector keys has a head and a signal lamp therein for indicating the condition of the key.

23. A teaching system as claimed in claim 1, wherein the actual reply selector of each of the student stations comprises three selector keys and a reply transfer key, said selector keys being binary codable in a manner whereby seven different replies may be provided by different combinations of operating said selector keys, and said reply transfer key when operated transfers the selected reply to the evaluating means.

24. A teaching system as claimed in claim 23, wherein the actual reply selector of each of the student stations comprises a rotary switch having a plurality of locking points and a plurality of contact points.

25. A teaching system as claimed in claim 1, wherein the correct reply transmitter of the instructor station comprises a rotary switch having a plurality of locking points and a plurality of contact points.

26. A teaching system as claimed in claim 1, wherein the correct reply transmitter and the correct reply memories are combined into a single unit at the instructor station, said unit comprising a selectable binary counter having selectable signal combinations which must coincide with the actual reply selected at a student station when the reply to a question is correct, a gate circuit comprising the reply number distributor of the evaluating means, the correct reply memories and the corresponding actual reply selector, said gate circuit providing a signal of a specific polarity for indicating a correct reply evaluation to the corresponding memory when the signal combination of the actual reply selector is the same as that of the correct reply memories and providing a signal of opposite polarity for indicating an incorrect reply evaluation to the corresponding memory when the signal combination of the actual reply selector is the same as that of the correct reply memories.

27. A teaching system as claimed in claim 1, wherein the correct reply memories, the distributors and the timer means of the evaluating means are integrated circuits and include a plurality of NAND gates.

28. A teaching system as claimed in claim 1, wherein the signal indicating means of the instructor station comprises a lamp field having a plurality of signal lamps each corresponding to a specific one of the student stations and a counting field having a plurality of counters each corresponding to a specific one of the student stations, and wherein the instructor station further comprises a reply number counter for indicating the number of questions, a class counter for evaluating all the incorrect and correct replies to each question and cancellation switch means for cancelling the contents of the counters and memories.

29. A teaching system as claimed in claim 28, wherein the class counter at the instructor station comprises a digital-analog converter having a counter relay and a switch operated by the counter relay.

30. A teaching system as claimed in claim 28, wherein each of the counters has terminals adapted for connection to printing means for printing the counter indications.

* * * * *